United States Patent
Dohi et al.

(12)

(10) Patent No.: US 11,867,210 B2
(45) Date of Patent: Jan. 9, 2024

(54) EXPANSION-TYPE ANCHOR, SLEEVE USED IN SAME, AND CONSTRUCTION METHOD

(71) Applicant: Yuji Dohi, Hong Kong (HK)

(72) Inventors: Yuji Dohi, Hong Kong (HK); Toshiji Hamada, Omihachiman (JP)

(73) Assignee: Yuji Dohi, Hong Kong (HK)

( * ) Notice: Subject to any disclaimer, the term of this patent is extended or adjusted under 35 U.S.C. 154(b) by 277 days.

(21) Appl. No.: 17/270,997

(22) PCT Filed: Aug. 26, 2019

(86) PCT No.: PCT/JP2019/033322
§ 371 (c)(1),
(2) Date: Feb. 24, 2021

(87) PCT Pub. No.: WO2020/045348
PCT Pub. Date: Mar. 5, 2020

(65) Prior Publication Data
US 2021/0324893 A1    Oct. 21, 2021

(30) Foreign Application Priority Data
Aug. 27, 2018   (JP) .................................. 2018-158696

(51) Int. Cl.
*F16B 13/06*  (2006.01)
*F16B 13/04*  (2006.01)

(52) U.S. Cl.
CPC ............ *F16B 13/06* (2013.01); *F16B 13/045* (2013.01)

(58) Field of Classification Search
CPC ..... F16B 13/0858; F16B 13/063; F16B 13/06
(Continued)

(56) References Cited

U.S. PATENT DOCUMENTS 2,120,577 A * 6/1938 Schulte ............... F16B 13/0858
411/72
2,403,541 A * 7/1946 Molat ..................... F16B 5/025
411/432

(Continued)

FOREIGN PATENT DOCUMENTS

DE    30 06 480 A1    8/1981
JP    4-27209 U    3/1992
(Continued)

OTHER PUBLICATIONS

International Search Report issued in PCT/JP2019/033322, dated Oct. 21, 2019 (2 pages).
(Continued)

*Primary Examiner* — Gary W Estremsky
(74) *Attorney, Agent, or Firm* — Hamre, Schumann, Mueller & Larson, P.C.

(57) ABSTRACT

Provided is an expansion-type anchor with excellent pull-out strength. The anchor comprises an anchor body 1 that has an expansion section 3 split by an inner slit 2, and a sleeve 9 to enclose and hold the expansion section 3 of the anchor body 1. The sleeve 9 is split into a plurality of follower expansion sections by an outer main slit 10 and an outer auxiliary slit 11. A group of balls 4 is disposed inside the anchor body 1, and the expansion section 3 expands into a tapered shape when the group of balls 4 is pressed by an expansion bolt 6. When a pull-out force is applied to the anchor body 1, the sleeve 9 does not retract and deforms by expanding after the retraction of the anchor body 1. As a result, the anchor body 1 is prevented from retracting by way of the sleeve 9 being sandwiched between a prepared hole 13 and the expansion section 3.

6 Claims, 12 Drawing Sheets

(58) Field of Classification Search
USPC .......................................................... 411/44
See application file for complete search history.

(56) References Cited

U.S. PATENT DOCUMENTS

| | | | | |
|---|---|---|---|---|
| 3,421,404 | A * | 1/1969 | Jacobs | F16B 13/066 411/65 |
| 4,447,182 | A * | 5/1984 | Murbach | F16B 13/066 411/45 |
| 4,485,847 | A * | 12/1984 | Wentzell | F16L 55/13 411/24 |
| 4,854,793 | A * | 8/1989 | Ollivier | F16B 13/045 411/39 |
| 6,135,688 | A * | 10/2000 | Belz | F16B 13/0858 411/60.3 |
| 6,579,049 | B2 * | 6/2003 | Kaibach | F16B 13/066 411/61 |
| 8,974,163 | B2 * | 3/2015 | Ricketts | F16B 13/063 411/57.1 |
| 2010/0003101 | A1 * | 1/2010 | Ricketts | F16B 13/063 411/57.1 |
| 2018/0023606 | A1 | 6/2018 | Hamada | |

FOREIGN PATENT DOCUMENTS

| | | |
|---|---|---|
| JP | 7-28259 Y2 | 6/1995 |
| JP | 2000-230279 A | 8/2000 |
| JP | 2004-218421 A | 8/2004 |
| JP | 2012-82892 A | 4/2012 |
| JP | 2015-102166 A | 6/2015 |
| JP | 2017-187069 A | 10/2017 |
| WO | 2016/121993 A1 | 8/2016 |
| WO | 2019/129460 A1 | 7/2019 |

OTHER PUBLICATIONS

Partial Supplementary European Search Report received in the corresponding European Patent application, dated May 13, 2022 (15 pages).

* cited by examiner

EXPANSION-TYPE ANCHOR, SLEEVE USED IN SAME, AND CONSTRUCTION METHOD

TECHNICAL FIELD

The present invention relates to an expansion anchor suitably used for attaching various types of elements to stone-based structures made of e.g. concrete or bricks, a sleeve used for such an anchor, and an installation method.

BACKGROUND ART

Expansion anchors of a post-installed type are used as a means to attach various types of elements to concrete structures such as buildings or tunnels. This type of expansion anchor has a cylindrical anchor body. The anchor body is formed with an expansive section, which is provided by a plurality of slits axially elongated and circumferentially spaced apart from each other, such that the expansive section expansively deforms (bulgingly deforms) in a direction orthogonal to the axis of the anchor body. As an expansion actuator that causes the expansive section to expand, use is made of a driving-type core rod (expanding pin) or one or a plurality of balls in combination with a bolt for pushing the balls. Patent Documents 1-3 disclose conventional anchors of the type to expand the expansive section by pushing balls with a bolt.

The expansion anchors disclosed in Patent documents 1 and 2 are of a tip-split type, that is, the slits in these anchors extend up to the tip end, whereas the anchor disclosed in Patent Document 3 is of a closed type, that is, the slits in this anchor do not reach the tip end of the anchor body and hence, the tip end is closed.

The type to expand the expansive section by pushing balls with a bolt as disclosed in Patent Documents 1-3 allows for controlling the degree of expansion of the expansive section, making it easy to adjust the pull-out resistance. In particular, when a lot of balls are used as in Patent Document 3, it is possible to make the expansive section longer so that the pressing force exerted on the pre-formed hole is dispersed. This provides an advantage that a cone failure at the installation region is prevented.

Moreover, while a core-rod-type expansion anchor requires the work of driving a core rod with a hammer and hence places a large burden on the worker, the type to use balls disclosed in Patent Documents 1-3 can turn the bolt with a power driver, which reduces burden on the worker.

An example of the type to expand the expansive section with a core rod is disclosed in Patent Document 4. In Patent Document 4, the outer sleeve is fixed to the anchor body so as not to shift. The portion of the outer sleeve that surrounds the expansive section is divided into a plurality of segments by a group of outer slits formed only at the tip end, and the pieces provide an outer expansive section.

According to the disclosure of Patent Document 4, when the expansive section of the anchor body expansively deforms, the outer sleeve also expands, following the expansion of the anchor body, so that the outer expansive section bites in a pre-formed hole, which increases the pressing force of the anchor body against the pre-formed hole. Thus, the core rod is prevented from falling out even when used in a vibration environment, and the pull-out resistance is increased.

PRIOR ART DOCUMENTS

Patent Documents

Patent Document 1: Microfilm of JP-U-H4-27209
Patent Document 2: JP-A 2004-218421
Patent Document 3: WO 2016/121993
Patent Document 4: JP-A 2017-187069

SUMMARY OF THE INVENTION

Problems to be Solved by the Invention

Although the expansive section of an expansion anchor bites in a pre-formed hole to some degree, since the pre-formed hole is generally straight, the anchor body falls out when a pull-out force larger than the frictional resistance between the pre-formed hole and the expansive section is exerted on the anchor body. Therefore, to increase the pull-out resistance of the expansion anchor, the frictional resistance between the pre-formed hole and the expansive section needs to be increased.

Various means for increasing the frictional resistance have been taken, such as increasing the flare angle of the expansive section or knurling the expansive section. However, when the flare angel of the expansive section is increased, stress concentrates on a narrow part of the concrete, which increases the possibility of a cone failure. As for the knurling, since concrete is hard, the expansive section may not sufficiently bite into the concrete even after knurling. Thus, in reality, knurling does not provide the friction increasing effect.

Patent Document 4 discloses that the pressing force (holding force) against the pre-formed hole can be increased by the outer expansive section of the outer sleeve biting into the pre-formed hole of the installation region. The outer sleeve seems to be fixed to the anchor body to prevent the anchor body from retreating relative to the outer sleeve. However, since concrete is hard, it is not clear whether the outer expansive section actually bites the pre-formed hole, so that presumably, whether or not the pull-out resistance is largely increased is unknown.

Pre-formed holes in the installation region are formed by drilling. Drilling a straight hole having the shape of a perfect circle in a hard installation region such as concrete requires considerable skill, so that, in reality, pre-formed holes are often curved or have a distorted cross-sectional shape rather than a perfect circle. Thus, there is a concern that if the outer sleeve is fixed to the anchor body as in Patent Document 4, the outer sleeve may be caught in the middle of a pre-formed hole during insertion into the pre-formed hole. If the outer sleeve in such a state is hit with a hammer, it may be buckled and become unusable.

It may be considered to avoid this by securing a sufficient clearance between the pre-formed hole and the outer sleeve. In that case, however, the pressing force of the expansive section against the pre-formed hole reduces so that a sufficient pull-out strength cannot be obtained.

An object of the present invention, which has been conceived in light of the aforementioned circumstances, is to provide a technique related to an expansion anchor that realizes a considerable increase in pull-out resistance, stabilization, easy and reliable installation and so on. Also, the present application discloses a lot of improvements related to an expansion anchor that can be independent inventions, and provision of such improvements can also be an object.

Means for Solving the Problems

The present invention includes various structural features. Typical aspects thereof are identified as first to ninth inventions.

The first invention is a generic invention and includes, as its basic features:

a hollow anchor body formed with an expansive section at a portion to be inserted into a pre-formed hole in an installation region, the expansive section being expansively deformable in a direction orthogonal to an axis of anchor body;

an expansion actuator that expansively deforms the expansive section of the anchor body; and a sleeve that externally surrounds at least at a portion of the expansive section of the anchor body.

The invention further includes the following features: the sleeve and the anchor body are configured to be movable relative to each other such that, when a pull-out force is exerted on the anchor body with the expansive section expanded, the sleeve is stopped in the pre-formed hole while allowing the anchor body to retreat.

In the first invention, the sleeve may be disposed only at the expansive section of the anchor body or may be disposed to span the expansive section and a non-expansive section. When the sleeve extends over the non-expansive section as well, the base end of the sleeve may be positioned at an opening edge of the pre-formed hole or positioned inwardly of the opening edge of the pre-formed hole.

The anchor body has a function to fix a mounted object to the installation region. As an example implementation, the anchor body may be formed with an internally threaded hole, and a fastening bolt may be screwed into the internally threaded hole to fix the object to the installation region. As another example of implementation, the anchor body may be formed with an internally threaded part exposed outside the installation region, and a nut is screwed to the externally threaded part to fix the element to the installation region. Alternatively, the anchor body may be provided with a bracket exposed outside the installation region, and the object may be attached to the bracket.

The first invention requires that the sleeve and the anchor body are movable relative to each other when a pull-out force is exerted on the anchor body. However, in the case where the sleeve is attached to the anchor body in advance, the sleeve may be fixedly positioned using e.g. an adhesive so as not to easily move relative to the anchor body so that the sleeve does not remove from the anchor body during distribution.

The second invention embodies the expansion structure of the first invention and has the following feature: when the expansive section is expanded, a tip end of the sleeve is positioned short of a tip end of the expansive section so that the expansive section includes an exposed part projecting from the tip end of the sleeve. In the present invention, terms "tip end (front end)" and "base end (rear end)" are used to identify the orientation, and these terms are defined based on the insertion direction into a pre-formed hole.

The third invention also embodies the expansion structure of the first invention. According to this invention, in the first or the second invention, the expansive section of the anchor body is formed with an axially elongated inner slit that allows the expansive section to be expansively deformable in the direction orthogonal to said axis, and the expansion actuator comprises a group of balls arranged in the anchor body at least within the expansive section, and a bolt that forwardly pushes the group of balls.

The fourth invention also embodies the expansion structure of the first invention. According to this invention, in the first or the second invention, the expansive section of the anchor body is formed with an axially elongated inner slit that allows the expansive section to be expansively deformable in the direction orthogonal to the axis, and the expansion actuator comprises a core rod configured to be inserted internally into the expansive section of the anchor body, and at least either one of the core rod and the expansive section is formed with a tapered part that causes the expansive section to expansively deform when the core rod is driven into the expansive section.

As the material for the sleeve, use may be made of a metal plate, a metal pipe or metal wires, for example. When a metal pipe is used, the portion of the sleeve that surrounds the expansive section of the anchor body is preferably configured to be expansively deformable due to the provision of a slit or a plurality of slits (or cuts). When wires are used, the configuration wound into a ring or a coil may be employed.

In the fifth embodiment, the sleeve is made of a metal plate. Specifically, according to the fifth invention, in any of the first through the fourth inventions, the sleeve is made of a metal, surrounds the anchor body from the expansive section up to a position short of the expansive section, and is split by a main outer slit extending along an entire length of the sleeve so as to have a non-looped shape, and a portion of the sleeve that fits to the expansive section of the anchor body is divided into a plurality of segments by an auxiliary outer slit that are open only forwardly of the anchor body.

The sleeve according to the fifth invention may be manufactured by a bending a metal plate material or by a punching a metal pipe material, for example.

The sixth invention embodies the fourth invention and has the following feature:

the anchor body has an externally threaded part that is exposed outside the installation region when attached to the installation region, the core rod has a head that is exposed behind the externally threaded part of the anchor body when driven into the anchor body, and either one or both of the core rod and the anchor body provide a space that allows a pull-out jig to engage with the head of the core rod driven into the anchor body.

The seventh invention relates to a method for fixing an expansion anchor in an installation region (installation method). The expansion anchor includes:

a hollow anchor body formed with an expansive section for insertion into a pre-formed hole in an installation region, the expansive section being expansively deformable in a direction orthogonal to an axis of the anchor body;

an expansion actuator that expansively deforms the expansive section of the anchor body; and a sleeve that externally fits around the anchor body at least at a portion of the expansive section.

Further, the method includes the steps of: inserting the sleeve alone into the pre-formed hole, subsequently inserting the anchor body into the pre-formed hole via the sleeve, and thereafter expanding the expansive section of the anchor body by the expansion actuator. Referring to the relationship between the sleeve and the pre-formed hole in the seventh invention, the sleeve may be pressed against the pre-formed hole due to an elastic restoring force, or the sleeve may be simply inserted without being pressed against the pre-formed hole.

The eighth invention is drawn to a sleeve alone and has the following feature:

a sleeve for use in any of claims 1-7, wherein the sleeve is set to a length that allows a base end thereof to be positioned at a base end of the pre-formed hole, and the base end of the sleeve is formed with an outward flange that engages the base end of the pre-formed hole.

The ninth invention relates to an expansion anchor according to a generic invention that compares to the first invention, and has the following basic features:

a cylindrical anchor body to be inserted into a pre-formed hole in an installation region, the anchor body having an internally threaded hole that is forwardly open;

a front member inserted into the anchor body through a tip end thereof to be screwed into the internally threaded hole; and a sleeve disposed between the front member and the anchor body, wherein the expansion anchor is configured such that in response to screwing the front member and the anchor body relative to each other, the sleeve expansively deforms in a direction orthogonal to an axis of the anchor body to be pressed against the pre-formed hole.

In addition to the above-described basic features, the following features may be included:

the anchor body has a central hole coaxial with the internally threaded hole and open rearwardly, and an exposed part that projects out of the installation region, the exposed part being formed with an engagement boss that allows turning by a hexagonal wrench, the front member is formed with an engagement hole for a hexagonal wrench inserted in the anchor body to engage therein, and the anchor body and the front member are configured to be able to rotate relative to each other by turning one of them while holding the other non-rotatably.

According to the ninth invention, in attaching the anchor, the sleeve can be expanded by, for example, turning, with a hexagonal wrench, the front member in the reverse direction for retreating movement, with the anchor body held non-rotatably with a female wrench.

On the other hand, according to the ninth invention, when the element is removed and the anchor becomes unnecessary, the anchor body can be removed from the installation region by, for example, turning the anchor body in the reverse direction with a female wrench, with the front member held non-rotatably with a hexagonal wrench. Although the front member and the sleeve are left in the pre-formed hole of the installation region, these are hidden in the pre-formed hole and not exposed to the outside. Thus, the front member and the sleeve will not be an obstacle. (The condition similar to that before installation is obtained by closing the pre-formed hole with mortar or a sealing material, for example.)

ADVANTAGES OF THE INVENTION

Advantages of the First Invention

According to the first invention, although the expansive section expanded in a flaring manner tends to remove (retreat) from the pre-formed hole when a pull-out force is exerted on the anchor body, such retreating movement of the expansive section causes the sleeve to be strongly caught between the expansive section and the pre-formed hole, because the sleeve and the anchor body are movable relative to each other.

That is, with the sleeve stopped in close contact with the pre-formed hole, the expansive section is strongly pressed against the sleeve. To put it simply, the sleeve acts as a wedge member to prevent removal of the anchor body. As the anchor body tends to retreat from the pre-formed hole, the wedge action becomes stronger, making the sleeve caught more strongly between the pre-formed hole and the expansive section. Thus, the expansion anchor provides a high pull-out resistance.

Since the installation process is the same as the conventional process, no more labor than before is required, so that the burden on the worker does not increase. Moreover, since it is only required to add a sleeve to a conventional expansion anchor, cost increase is limited.

Since the sleeve increases the pull-out resistance, a lower degree of expansion of the expansive section than conventionally needed provides approximately the same level of pull-out resistance as conventionally possible. Thus, it is possible to reduce the pressing force to be exerted on the pre-formed hole while achieving a required pull-out resistance. This contributes to reducing the burden on the worker while also enhancing the cone-failure prevention effect at the installation region.

Pre-formed holes are formed by drilling, and as mentioned before, drilling a hole having a perfect circular shape is difficult. Thus, pre-formed holes are often curved or have a distorted shape such as an oval shape. Also, variations in the inner diameter are inevitable. Therefore, with a conventional anchor of a core-rod driving type, the pull-out resistance was often not constant (not stable). (In the case of a ball type anchor, the degree of expansion of the expansive section can be adjusted, which contributes to the stabilization of the pull-out strength.)

According to the first invention, however, the sleeve acts as a wedge, so that the variations in the inner diameter or shape of the pre-formed holes, if any, can be compensated for by the sleeve. Therefore, even when the degree of expansion of the expansive section is fixed as with the anchor of the core-rod driving type, a stable pull-out strength is obtained. This is one of the significant advantages of the present invention.

Advantages of the Second Invention

When the second invention is employed, the expanding deformation of the expansive section of the anchor body is facilitated. This contributes to increasing the pull-out resistance. Moreover, since the portion of the expansive section that is offset toward the tip end is exposed outside the sleeve, the sleeve does not retreat along with the expansive section but is reliably stopped in close contact with the inner surface of the pre-formed hole. Thus, the wedge effect is sufficiently exerted, and the pull-out resistance is reliably increased.

Advantages of the Third Invention

As mentioned before, when a group of balls and a bolt are used as the expansion actuator as in the third invention, the expansion of the expansive section can be performed by using a power driver, which considerably reduces the burden on the worker. Such reduction of the burden on the worker is particularly remarkable in the case of installation on a ceiling or the work in high places. Moreover, since the tightening torque is adjustable, the torque can be advantageously controlled easily, and even when the fastening force is lowered due to the long use, a predetermined fastening force can be advantageously recovered by additional tightening.

In an expansion anchor that uses a core rod to expand the expansive section, the anchor body is generally formed with an externally threaded portion, and a mounted object is fixed to the installation region with a nut screwed to the externally threaded portion. Since the externally threaded portion is exposed outside the installation region, after the object is removed, the exposed portion of the anchor body is normally cut away by using a sander. However, the use of a sander generates sparks, and such sparks by the sander may ignite nearby combustible materials to lead to a fire.

In contrast, according to the third invention, the pressing force by the expansive section can be reduced by loosening the bolt pushing the balls. Thus, when the object is removed and the anchor becomes unnecessary, the expansion anchor can be easily removed. Thus, the labor needed for disposal treatment after the removal of the object is reduced.

Advantages of the Fourth Invention

An anchor of the type that expands the expansive section of the anchor body by hitting a core rod with a hammer has an advantage that the work to expand the expansive section can be performed quickly. However, as mentioned before, it places a large burden on the worker because swinging down a hammer requires a large force. There is also a problem that a cone failure is likely to occur at the installation region.

In contrast, according to the fourth invention, since the sleeve provides an improved pull-out resistance, the necessary pull-out strength is secured while the degree of expansion of the expansive section is made smaller. Thus, it is possible to reduce the burden on the worker and prevent a cone failure while also achieving the pull-out resistance of approximately the same level as conventionally possible.

Advantages of the Fifth Invention

For the sleeve, various materials and various configurations may be employed. Making the sleeve from a metal plate as in the fifth invention provides high durability and high wedge effect. Moreover, this invention is advantageous in terms of cost, because a commercially available plate material or pipe can be used. Furthermore, since the sleeve is attached to the anchor body due to an elastic restoring force, it allows easy installation and provides excellent practicability.

Advantages of the Fifth Invention

While a pipe without any modification can be used as a material for the sleeve, a non-looped sleeve having a main slit as in the fifth invention makes the sleeve easily deformable for expansion or compression against an elastic force. With such an arrangement, machining errors in the sleeve and the anchor body, if any, can be compensated for, so that the sleeve is reliably attached to the anchor body or the pre-formed hole. Thus, excellent practicability is provided. Moreover, the length or outer diameter of the sleeve can be set more freely than when using a pipe as a material for the sleeve, which favors the manufacturing process.

Moreover, since the portion of the sleeve that covers the expansive section of the anchor body (follower expansive section) is divided into a plurality of segments by an auxiliary outer slit, it is possible to improve conformance of the sleeve to the pre-formed hole upon application of a pressing action by the anchor body. This reliably contributes to generation of a wedge effect and enhancement of the pull-out strength.

Advantages of the Sixth Invention

As mentioned before, in an expansion anchor of the type that expands the expansive section by driving a core rod, when the anchor body has an externally threaded section exposed outside the installation region, a work to remove the externally threaded section after attachment of an object has been troublesome.

In contrast, in the sixth embodiment, a space defined in front of the head of the core rod can be used to bring a pull-out jig into engagement with the head, so that the core rod can be pulled out with the jig after removal of the object. When the core rod is pulled out, the resistance of the expansive section exerted on the pre-formed hole reduces, so that the anchor body can be easily pulled out from the pre-formed hole.

Thus, according to the sixth invention, in the expansion anchor of the core-rod driving type, a treatment after removal of the object can be performed easily and safely, in spite of the sleeve provides a high pull-out resistance due to a wedge action.

Advantages of the Seventh Invention

The first to the sixth expansion anchors can be used with the sleeve attached to the anchor body in advance. In this case, the expansion anchor with the sleeve is inserted into a pre-formed hole, and then the expansive section is expanded with the expansion actuator. Since pre-formed holes often vary in shape or the like as mentioned before, the outer sleeve, when attached in advance to the anchor body, may be caught halfway in a pre-formed hole during insertion into the pre-formed hole.

However, when the seventh invention is employed, the sleeve is inserted into the pre-formed hole in advance, so that a buckling problem of the sleeve does not occur. The anchor body is then inserted into the sleeve. Since the inner surface of the sleeve is smooth, the anchor body can be smoothly inserted even when it is inserted by hitting into the sleeve. Thus, in any case, the sleeve does not buckle.

Advantages of the Eighth Invention

Forming a flange at the base end of the sleeve as in the eighth invention makes it possible to control the insertion depth of the sleeve when the sleeve is first inserted into a pre-formed hole. Thus, even when the anchor body is driven into the sleeve by hitting with a hammer, the sleeve is prevented from shifting. Thus, the sleeve can be set in a predetermined depth, and the effect of an increase of the pull-out resistance is reliably realized.

Advantages of the Ninth Invention

In the first invention, the pull-out resistance is basically provided by the expansive section of the anchor body, and the sleeve assists the function of the expansive section. On the other hand, in the ninth invention, the sleeve is an essential element for the pull-out resistance, and the anchor body is attached in the pre-formed hole due to the expansion of the sleeve.

One of the features of the ninth invention is that the expansive section is expansively deformed by screwing the anchor body. This feature considerably reduces the burden on the worker as compared with the driving work using a hammer. Another of the features of the ninth invention is that the anchor body can be screwed rearwardly for removal from the installation region. With such a feature, the anchor body can be removed after removal of an unnecessary object, which prevents the expansion anchor from becoming an obstacle.

BRIEF DESCRIPTION OF THE DRAWINGS

FIG. 1(A) is an exploded perspective view, FIG. 1(B) is a side view, FIG. 1(C) is a view seen from C-C direction in FIG. 1(B), FIG. 1(D) is a view seen from D-D direction in FIG. 1(B), FIG. 1(E) is a sectional view, FIG. 1(F) is a sectional view in the installed state, and FIG. 1(G) is a view illustrating the action.

FIG. 2(A) is a graph of test results, FIG. 2(B) is a sectional view of an example (sample), and FIG. 2(C) is a view for describing the wedge effect.

FIGS. 3 are views showing second to twelfth embodiments, wherein FIG. 3(A) is a side view partially in longitudinal section showing an expansion-type anchor according to a second embodiment, FIG. 3(B) is a side view partially in longitudinal section showing an expansion-type anchor according to a third embodiment, FIG. 3(C) is an end view of a sleeve as seen in the direction of arrows C-C in FIG. 3(B), FIG. 3(D) is a side view partially in longitudinal section showing an expansion-type anchor according to a fourth embodiment, FIG. 3(E) is a perspective view showing a sleeve according to a fifth embodiment, FIG. 3(F) is a side view showing a sleeve according to a sixth embodiment, FIG. 3(G) is a side view partially in longitudinal section showing an expansion-type anchor according to a seventh embodiment, FIG. 3(H) is an enlarged partial side view showing a sleeve according to an eighth embodiment, FIG. 3(I) is an enlarged partial side view showing a sleeve according to a ninth embodiment, FIG. 3(J) is side view showing a sleeve according to a tenth embodiment, FIG. 3(K) is a side view showing an anchor body according to an eleventh embodiment, and FIG. 3(L) is a side view showing an anchor body according to a twelfth embodiment.

FIGS. 4 are views showing thirteenth to twentieth embodiments, wherein FIG. 4(A) is a side view partially in longitudinal section showing an expansion-type anchor according to a thirteenth embodiment, FIG. 4(B) is a side view showing an expansion-type anchor according to a fourteenth embodiment, FIG. 4(C) is a side view showing an expansion-type anchor according to a fifteenth embodiment, FIG. 4(D) is a side view showing an expansion-type anchor according to a sixteenth embodiment, FIG. 4(E) is a partial side view showing an expansion-type anchor according to a seventeenth embodiment, FIG. 4(F) is a partial side view partially in longitudinal section showing an expansion-type anchor according to an eighteenth embodiment, FIG. 4(G) is a side view partially in longitudinal section showing an expansion-type anchor according to a nineteenth embodiment, and FIG. 4(H) is a side view partially in longitudinal section showing an expansion-type anchor according to a twentieth embodiment.

FIG. 5(A) is an exploded side view, FIG. 5(B) is a view seen from B-B direction in FIG. 5(A), FIG. 5(C) is a view seen from C-C direction in FIG. 5(A), FIG. 5(D) is a sectional side view in the state inserted into a pre-formed hole, and FIG. 5(E) is a sectional side view after expansion.

FIG. 6(A) is a sectional side view with an element fixed, and FIGS. 6(B) and 6(C) are sectional side views showing the steps for pulling out a core rod.

FIG. 10(A) is an exploded side view, FIG. 10(B) is a view seen from B-B direction in FIG. 10(A), FIG. 10(C) is a view seen from C-C direction in FIG. 10(A), FIG. 10(D) is a view seen from D-D direction in FIG. 10(A), FIG. 10(E) is a side view in the assembled state, FIG. 10(F) is a sectional side view after set in a pre-formed hole, and FIG. 10(G) is a sectional side view after the expansive section is expanded.

FIG. 11(A) is a sectional side view in the state in which an element is fixed, FIG. 11(B) is a sectional side view showing a step of pulling out an anchor body, FIG. 11(C) is a sectional side view showing the state after the anchor body is pulled out, and FIG. 11(D) is a sectional side view showing the state in which the pre-formed hole is closed.

FIG. 12(A) is a sectional side view partially cut away, FIG. 12(B) is an exploded side view, FIG. 12(C) is a view seen from C-C direction in FIG. 12(B), FIG. 12(D) is a view seen from D-D direction in FIG. 12(B), FIG. 12(E) is a view seen from E-E direction in FIG. 12(B), FIG. 12(F) is a sectional side view showing the expansion step, and FIG. 12(G) is a sectional side view after the anchor body is pulled out.

FIG. 13(A) is a sectional side view in the state set in the pre-formed hole, FIG. 13(B) is a sectional side view showing the expansion step, FIG. 13(C) is a view seen from C-C direction in FIG. 13(A), FIG. 13(D) is a view showing a variation of FIG. 13(D), FIG. 13(E) is a view seen from E-E direction in FIG. 13(A), and FIG. 13(F) is a view seen from F-F direction in FIG. 13(A), FIG. 13(G) is a view showing a thirty-first embodiment, and FIG. 13(H) is a view showing a thirty-second embodiment.

Figure 1:
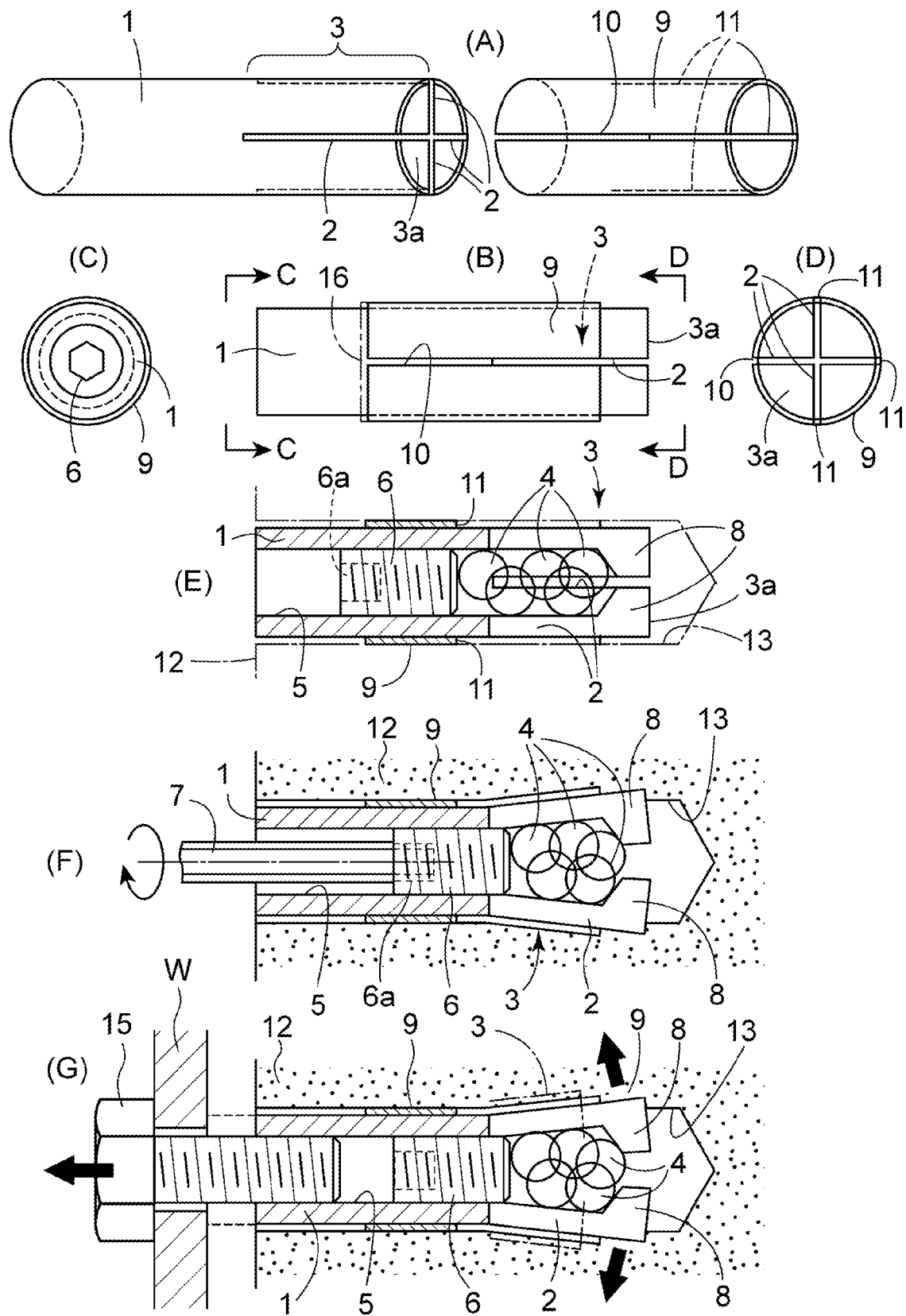
FIGS. 1 are views showing a first embodiment.

MODE FOR CARRYING OUT THE INVENTION (1). The Configuration of the First Embodiment Embodiments of the present invention are described below based on the drawings. For start, a first embodiment shown in FIG. 1 is described. An expansion anchor (hereinafter simply referred to as "anchor"), which may be used fora concrete structure, includes an anchor body 1 made of steel (made of iron).

The anchor body 1 has a hollow cylindrical shape and is formed with an expansive section 3 provided with four inner slits 2 on a tip end side. That is, by forming the four inner slits 2, the expansive section 3 is formed on the tip end side. The four inner slits 2 are equally spaced circumferentially from each other and open to a tip end surface 3a of the expansive section 3 (or of the anchor body 1). Thus, the anchor of this embodiment is of a tip-split type.

As a means for expanding the expansive section 3, a large number of balls 4 are loaded in the anchor body 1. (In the sectional view, the inner slits 2 are shown to be visible behind the balls 4 only for illustrative purposes.) The inner circumferential surface of the anchor body 1 is formed with an internally threaded hole 5, and an expanding bolt 6 for pushing the group of balls 4 is screwed into the internally threaded hole 5.

Although the balls 4 are shown to be equally sized, it is actually preferable to load balls of different diameters as densely as possible. The expanding bolt 6 has no head and is formed, at its base end surface (rear end surface), with an engagement hole 6a for engagement with a hexagonal wrench 7 for example. Note that the internally threaded hole 5 may be formed along the entire length of the anchor body 1.

The tip end of the anchor body 1 is formed with inward projections (stopper) 8 for preventing the balls 4 from removal. The inward projections 8 are separated from each other by the inner slits 2. The inner circumferential surface of the expansive section 3 is straight except at the inward projections 8.

A cylindrical sleeve 9 is mounted to the anchor body 1 so as to span the expansive section 3 and a non-expansive section. The sleeve 9 is formed by bending a metal strip or plate made of e.g. stainless steel, spring steel or aluminum and split into a non-loop shape by an outer main slit 10 extending along the entire length. Before mounted to the anchor body 1, the diameter of the sleeve 9 is smaller than the outer diameter of the anchor body 1. Thus, the anchor body 1 is elastically held in the sleeve 9.

The length of the sleeve 9 is shorter than that of the anchor body 1 and longer than that of the expansive section 3 of the anchor body 1. The tip end of the sleeve 9 is positioned behind the tip end of the anchor body by a certain distance. Therefore, a portion of the expansive section 3 on the tip end side with a length E is an exposed portion that is not surrounded by the sleeve 9.

The sleeve 9 is further formed with three outer auxiliary slits 11 that are open to the tip end and equally spaced circumferentially from each other. Thus, in this embodiment, the sleeve 9 is formed with the same number of outer slits 10, 11 as the inner slits 2 of the anchor body 1, and the portion of the sleeve divided by the outer slits 10, 11 provides an expansive follower that expands along with the expansive section 3 of the anchor body 1.

The outer slits 10, 11 may be in the form of cut lines. The outer slits 10, 11 of the sleeve 9 and the inner slits 2 of the anchor body 1 are shown to overlap with each other in the drawings only for the convenience of illustration. In reality, the relative orientation of the anchor body 1 and the sleeve 9 is not fixed.

When the anchor is inserted into a pre-formed hole 13 formed in an installation region 12 made of concrete and the expanding bolt 6 is screwed in with a hexagonal wrench 7, the expansive section 3 is pushed by the group of balls 4 in a direction orthogonal to the axis and thereby expanded. As a result, the expansive section 3 is strongly pressed against the pre-formed hole 13, so that the anchor is fixed in the pre-formed hole 13. The compressive force by the balls 4 is applied generally uniformly along the entire length of the expansive section 3.

In this embodiment, since the length of the expansive section 3 is approximately equal to the outer diameter of the anchor body 1, the expansive section 3 deforms in a flaring manner. However, when the length of the expansive section 3 is not less than 2-3 times the outer diameter of the anchor body 1, only a root portion of the expansive section 3 deforms in a flaring manner, whereas the remaining portion of the expansive section expands while keeping its straight shape.

The method for fixing a mounted object W (supporting method) may be selected in accordance with the application. In the illustrated embodiment, the object W is fixed by being pressed against the surface of the installation region 12 with a fastening bolt 15 screwed into the internally threaded hole 5 of the anchor body 1. In the case where the anchor is intended for attachment to a ceiling, a suspension bolt may be used rather than the fastening bolt 15, and a ceiling object may be suspended by the suspension bolt via a bracket. Instead of the fastening bolt 15, an eyebolt may be screwed into the anchor body 1 so that the object can be suspended by the eyebolt.

As indicated by chain lines in FIG. 1(B), the anchor body 1 may be formed with an annular projection 16 as a stopper for preventing the retreating movement of the sleeve 9. As another example, dot-like projections or strip-like projections of a certain length may be employed as a stopper.

(2). Effects and Advantages

The anchor body 1 is fixed such that the surface of the installation region 12 and the rear end surface of the anchor body 1 are flush with each other. FIG. 1(G) shows the state in which the anchor body 1 is shifted due to a large pull-out load exerted on the anchor body 1 and a large gap is formed between the object W and the installation region 12.

In order for the anchor body 1 to shift toward the state shown in FIG. 1(G), the expansive section 3 deformed in a flaring manner needs to move. In this embodiment, however, the expansive section 3 of the anchor body 1 is held in the sleeve 9. Thus, if the anchor body 1 tends to move toward the state shown in FIG. 1(G), the sleeve 9 acts as a wedge, generating a large resistance against the movement of the anchor body 1.

Figure 2:
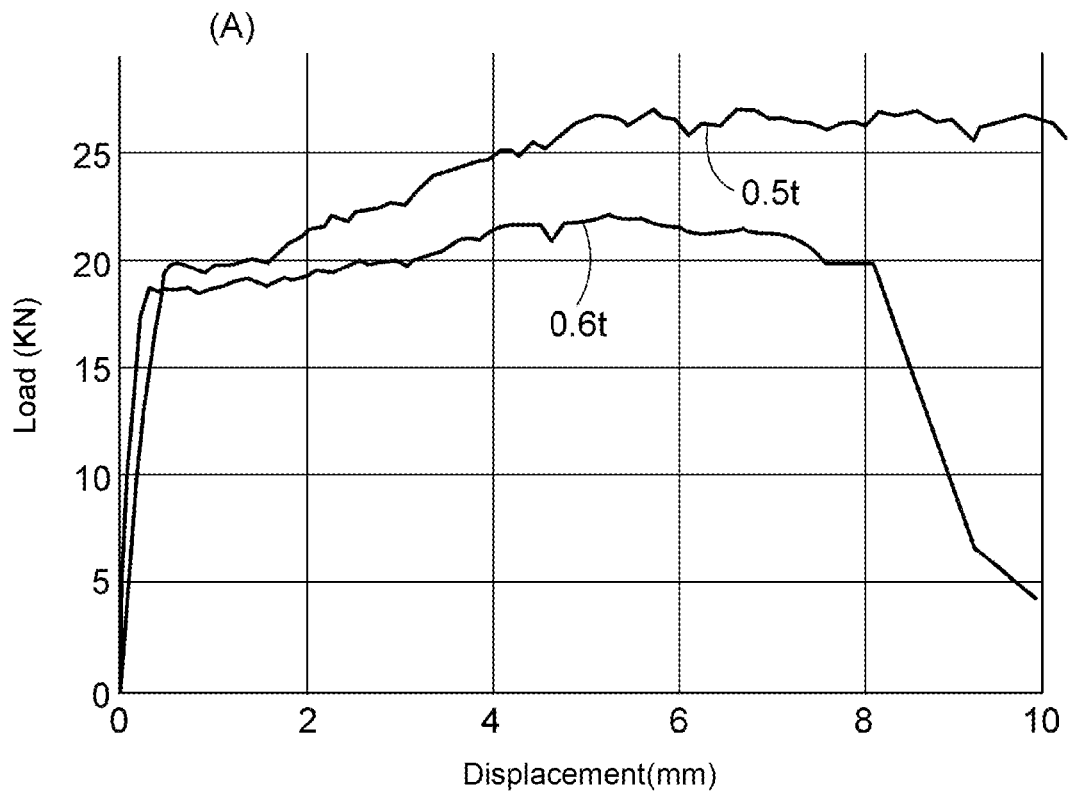
FIGS. 2 are views for describing effects and advantages.
Figure 2:
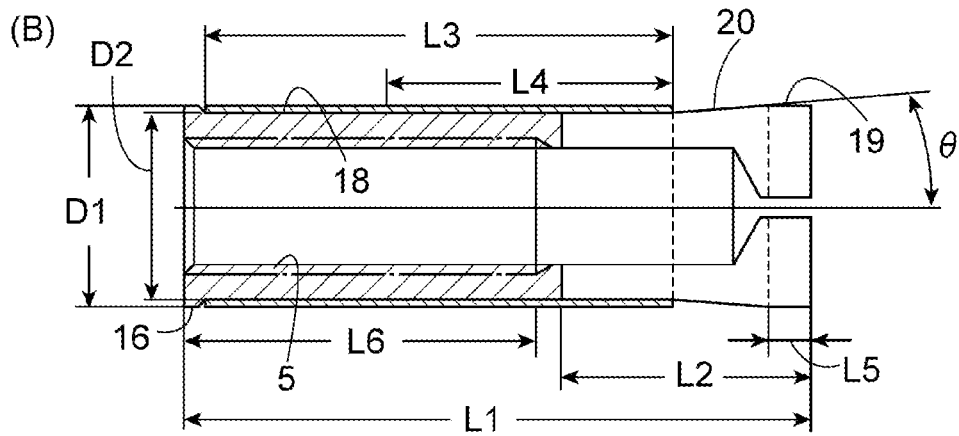
Figure 2:
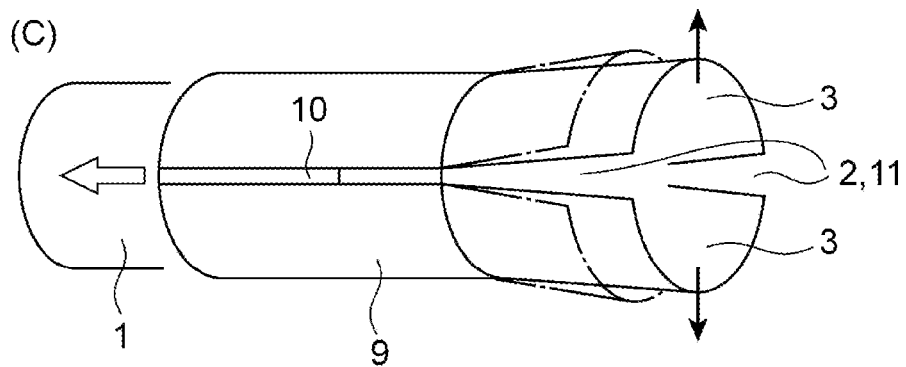

That is, since the portion of the sleeve 9 that overlaps with the expansive section 3 also deforms in a flaring manner as shown in FIG. 2(C), as the expansive section 3 tends to move in the removal direction, the sleeve 9 is more strongly caught between the expansive section 3 and the pre-formed hole 13, hindering the shifting movement of the expansive section 3. In this way, a large pull-out resistance is exerted.

Specifically, when the anchor body 1 tends to move in the removal direction, the sleeve 9 is pushed in the direction orthogonal to the axis because of its flaring shape. However, movement of the sleeve 9 in the direction orthogonal to the axis is hindered by the pre-formed hole 13. Thus, although the anchor body 1 can retreat relative to the sleeve 9 by a slight amount, further retreating movement is hindered by the sleeve 9. Thus, in reality, the anchor body 1 used in normal conditions cannot be pulled to the position shown in FIG. 1(G).

Herein, a question may arise as to a possibility that the anchor body 1 and the sleeve 9 may shift together. However, though the anchor body 1 and the sleeve 9 move relative to each other, the sleeve 9 does not move or hardly moves relative to the pre-formed hole 13. Thus, the sleeve 9 reliably functions as a stopper to prevent the retreating movement (falling-out) of the anchor body 1.

The reason why the sliding movement between the sleeve 9 and the pre-formed hole 13 does not occur even when the sliding movement between the anchor body 1 and the sleeve 9 occurs is presumed to reside in that the frictional resistance between the sleeve 9 and the pre-formed hole 13 is larger than that between the sleeve 9 and the expansive section 3. Because of such a difference in frictional resistance, the retreating movement of the anchor body 1 is considered to cause the sleeve 9 to be pressed against the pre-formed hole 13 and thereby held against shifting. When the sleeve 9 is divided by the outer slits 10, 11 as in the embodiment, the action of pressing the sleeve 9 against the pre-formed hole 13 is strong, which is favorable for providing a stopper function to prevent the shifting movement of the expansive section.

As described above, the sleeve 9 expansively deforms due to the shifting movement of the anchor body 1. This means that the sleeve 9 expands following the removal movement of the anchor body 1.

In this embodiment, the tip end of the expansive section 3 is an exposed portion that is not covered with the sleeve 9, so that the tip end of the expansive section 3 bites in the pre-formed hole 13. In this way, the expanding deformation of the expansive section 3 is facilitated, providing a large resistance against a pull-out force. Thus, for the anchor body 1 to retreat, the pre-formed hole needs to be broken by the tip end of the expansive section 3. This also contributes to an increase in pull-out resistance.

Moreover, since the tip end of the expansive section 3 is exposed outside the sleeve 9, the sleeve 9 does not retreat with the expansive section 3 but is strongly pressed against the pre-formed hole 13 due to the expanding action of the expansive section 3. Thus, the sleeve 9 reliably prevents the expansive section 3 from sliding out.

(3). Test Results

FIG. 2(A) shows the pull-out test results of examples. The examples of sleeves (samples) used in this test had an outer diameter D1 of 14.6 mm and a total length L1 of 45 mm. Five sleeves 9 having a thickness of 0.5 mm and five sleeves 9 having a thickness of 0.6 mm were prepared, and averages were taken to make a graph.

In this example, a base end of the anchor body 1 was formed with an annular projection 16 having the same outer diameter as the sleeve diameter. A portion of the anchor body extending forwardly from the annular projection 16 up to a generally middle point of the expansive section 3 was a smaller-diameter straight section 18 having an outer diameter D2 of 13.6 mm. A front end portion of the expansive section 3 was a larger-diameter straight portion 19 having a diameter equal to the sleeve diameter D1. A portion of the anchor body between the smaller-diameter straight portion 18 and the larger-diameter straight portion 19 was a flaring portion 20. The angle of the flaring portion was about 5°. The annular projection 16 functioned as a stopper for preventing retreating movement of the sleeve 9.

The entire length L2 of the expansive section 3 was 18 mm, the entire length L3 of the sleeve 9 was about 33.5 mm, the length L4 of the outer auxiliary slits 11 in the sleeve 9 was about 24 mm, the length L5 of the larger-diameter straight portion 19 was 3.2 mm, and the length L6 of the internally threaded hole 5 was 25 mm. As a bolt, an M10 bolt was used. 4-5 mm balls were used as the balls 4. The pre-formed hole 13 was formed with a drill having an outer diameter of 15 mm.

Generally, for expansion anchors having an outer diameter of about 14 to 15 mm, an yielding load is about 15 KN at most. In contrast, the samples used in this example had a pull-out strength of about 20 KN, which indicates an extremely high fastening force as compared with conventional products. In the graph for the anchors having a thickness of 0.6 mm, the load dropped sharply when the pull-out amount exceeded 8 mm, indicating a breakage of the concrete structure.

Regarding the thickness of the sleeve 9, it was found that, within an elastically deformable range, the thicker sample showed a smaller rate of increase in displacement of the anchor body versus the rate of increase in load. In other words, with an equal load applied, the displacement of the anchor body with a thicker sleeve 9 was smaller than that with a thinner sleeve. Presumably, this is because a thicker sleeve 9 forms a smaller clearance between the sleeve 9 and the pre-formed hole 13 and hence creates a larger contact area between the sleeve 9 and the pre-formed hole 13 at the expansive section 3.

Therefore, it is presumed that regardless of the thickness of the sleeve 9, the rate of increase in displacement versus the rate of increase in load can be made as small as possible by making the clearance between the pre-formed hole 13 and the sleeve 9 as small as possible. In practice, it is intended to use the expansion anchor only with a fraction of the maximum applicable, thereby ensuring a very high safety factor. Thus, it is preferable that the rising line of the displacement-load curve is closer to the vertical axis of the graph as much as possible. The product embodying the present invention is considered to be excellent for actual use in that it can be held against a shift movement even when a load is applied.

The yield point is not much influenced by the thickness of the sleeve 9. However, looking at the change of the load (stress) beyond the yield point, the load is found to be higher (i.e., the pull-out resistance is larger) for the sleeve 9 having the thickness of 0.5 mm. The reason for this is not clear, but presumably, a thinner sleeve 9 provides a better conformance (affinity) to concrete and hence provides a larger resistance.

As the materials, a rolled steel generally used for structures was used for the anchor body 1, while a cold-rolled steel plate was used for the sleeve 9. The material for the sleeve 9 may have a great influence on the pull-out resistance. A soft metal plate such as an aluminum plate is considered to be suitable, but such a soft metal plate may provide an excessively high conformance to the expansive section 3, which may result in the sleeve 9 retreating with the anchor body 1.

As described above, while exposing the tip end of the expansive section 3 is advantageous, it is preferable that the thickness of the sleeve 9 is as small as possible for facilitating biting of the expansive section 3 into the pre-formed hole 13. In the experiments performed by the inventors of the present application, a pull-out strength of not less than 22 KN was obtained at the yield point when a sleeve having a thickness of 0.2 mm or 0.25 mm was used. It was also found that when such a sleeve was used, a cone failure of concrete was unlikely to occur and the pull-out resistance tends to increase even beyond the yield point.

Therefore, it is desirable that the thickness of the sleeve 9 is small, but if too thin, the sleeve will easily break due to a strength decrease. In reality, a suitable thickness range is estimated to be about 0.2 to 0.6 mm.

(4). Second to Seventh Embodiments

Figure 3:
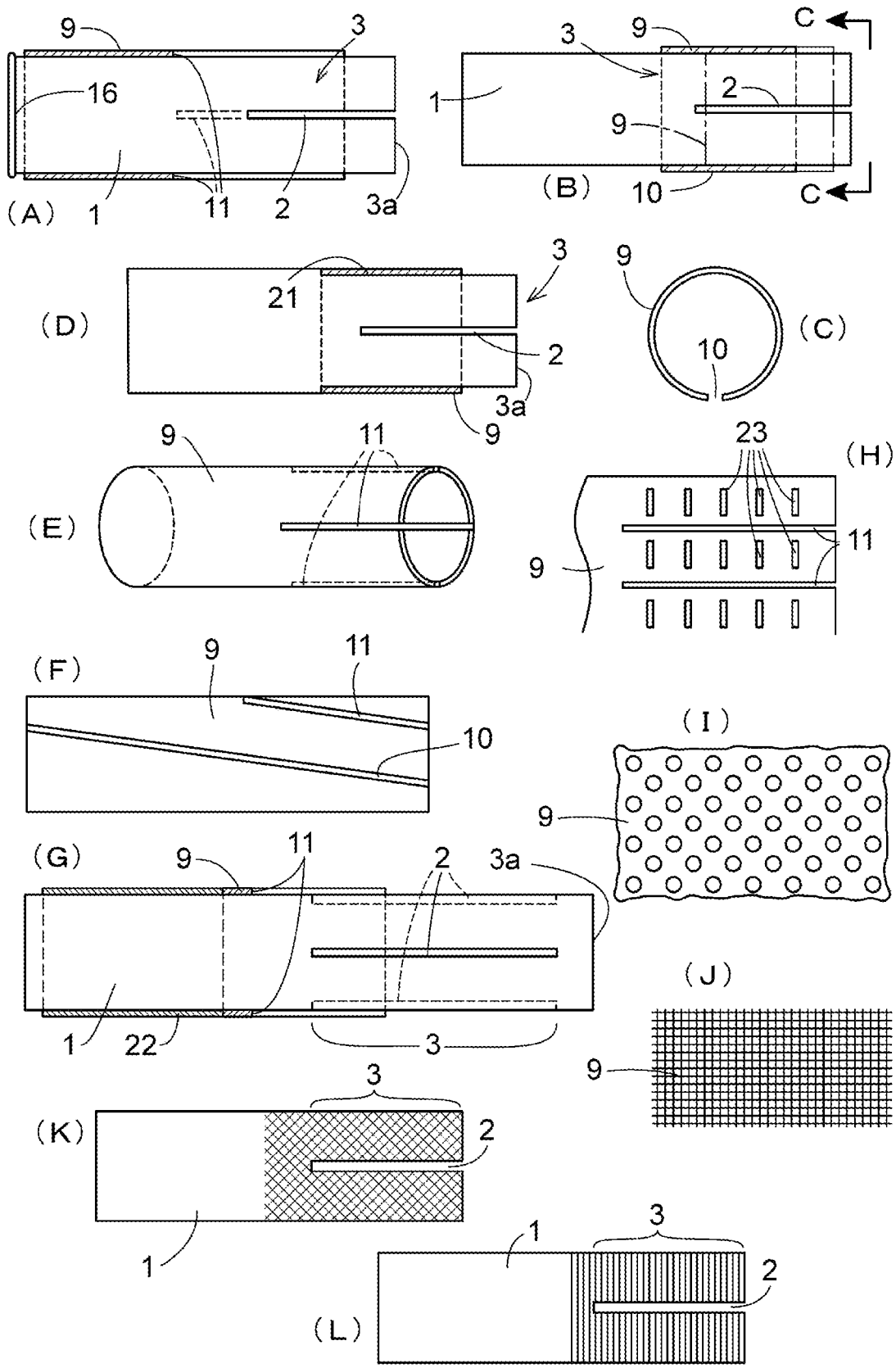

Next, other embodiments shown in FIG. 3 and the subsequent figures are described. In the second embodiment shown in FIG. 3(A), the length of the sleeve 9 is set to be approximately the same as that of the anchor body 1. Such a configuration improves the stability of the expansion anchor within the pre-formed hole 13. Preferably, the base end of the anchor body 1 is provided with a flange-like annular projection 16 that prevents retreating movement of the sleeve 9.

In the case where the sleeve 9 is attached to the anchor body 1 in advance, it is desirable to position the sleeve 9 relative to the anchor body 1 in advance. For example, as a means to position the sleeve 9, the sleeve 9 may be temporarily fixed to the anchor body 1 with an adhesive. However, when such temporary fixing using an adhesive is employed, the sleeve may be caught in the pre-formed hole and thereby retreat relative to the anchor body during the insertion of the anchor body into the pre-formed hole.

In contrast, when the anchor body 1 is provided with a retreat prevention means (stopper) like the annular project ion 16, the sleeve 9 is precisely positioned, so that the wedge effect is reliably exerted. Instead of the annular projection 16, a plurality of projections circumferentially spaced from each other, an annular groove, or a plurality of circumferentially separated grooves may be employed as a positioning means. When a groove or grooves are employed as the positioning means, the sleeve may be formed with an inwardly projecting engagement segment or segments for fitting into the groove or grooves. In this case, the engagement segment(s) and the groove(s) need to allow relative movement between the sleeve and the anchor body in the axial direction.

Since the opening edge of the pre-formed hole 13 generally tend to become slightly widened due to the shaking movement of the drill, the annular projection 16 is readily inserted into the opening of the pre-formed hole 13 even when the base end of the anchor body 1 is provided with an annular projection 16. Thus, the base end of the anchor body 1 does not project from the installation surface.

In the third embodiment shown in FIGS. 3(B) and 3(C), the sleeve 9 has an outer main slit 10 alone and is not provided with outer auxiliary slits 11. In this embodiment again, the sleeve 9 expands following the shifting movement of the anchor body 1 and hence exerts the wedge effect. As indicated by the chain lines, the sleeve 9 may be arranged only at the area of the expansive section 3. In this case again, it is preferable that the tip end of the expansive section 3 is exposed in front of the sleeve 9.

When the sleeve 9 is provided only at the area of the expansive section 3, the sleeve 9 may be provided with outer auxiliary slits 11 in addition to the outer main slit 10. Alternatively, as shown in FIG. 3(E), the sleeve may have one or a plurality of outer auxiliary slits 11 alone to thereby include a portion in the shape of a perfect loop (non-expansive section) on the base end side.

In the fourth embodiment shown in FIG. 3(D), a portion of the anchor body 1 that includes the expansive section 3 is stepped inward by an amount generally corresponding to the thickness of the sleeve 9, to provide a smaller-diameter portion 21. The sleeve 9 is fitted to the smaller-diameter portion 21. With such an arrangement, the base end of the smaller-diameter portion 21 functions as a stopper that prevents retreating movement of the sleeve 9. In this embodiment, the entirety of the anchor body 1 can be brought into close contact with the pre-formed hole 13 as much as possible, which improves the stability of the anchor. As a variation of FIG. 3(D), the outer circumferential surface of the expansive section 3 may provide a smaller-diameter portion 21, and the sleeve 9 is arranged only at the expansive section 3.

In the fifth embodiment shown in FIG. 3(E), the sleeve 9 is made using a pipe as a material and formed with a plurality of outer auxiliary slits 11, which are open forwardly, at least at a portion that surrounds the expansive section 3 of the anchor body 1. Thus, the sleeve 9 includes a non-expansive section that is continuous around the entire circumference.

In the sixth embodiment shown in FIG. 3(F), the outer main slit 10 and the outer auxiliary slits 11 of the sleeve 9 are formed in an orientation inclined with respect to the axis. Specifically, a plurality of such outer auxiliary slits 11 are formed.

In the seventh embodiment shown in FIG. 3(G), in addition to the sleeve 9 that surrounds the expansive section 3, a spacer ring 22 positioned on the base-end side of the sleeve 9 is fitted to the anchor body 1. The spacer ring 22 is a stopper that prevents the anchor from shaking within the pre-formed hole 13 for better stability while also preventing retreating movement of the sleeve 9. The spacer ring is non-movably attached to the anchor body 1 by e.g. spot welding or forced fitting.

In the seventh embodiment, the inner slits 2 are not open at the tip end surface 3a of the anchor body 1. That is, the expansive section 3 is of a closed type in which the tip end is not split. In this embodiment, the expansive section 3 is bulgingly deformed into a trapezoidal shape or an arcuate shape as viewed in a direction orthogonal to the axis. The tip end of the sleeve 9 is positioned offset toward the base end side relative to the middle point of the expansive section 3.

(5). Eighth to Eighteenth Embodiments

In the eighth embodiment shown in FIG. 3(H), the expansive section 3 of the sleeve 9 is formed with a large number of square holes 23. In the ninth embodiment shown in FIG. 3(I), the sleeve 9 is made of a perforated metal with a large number of round holes. In the tenth embodiment shown in FIG. 3(J), the sleeve 9 is formed of a wire mesh made of stainless steel, for example. Preferably, the wire mesh of FIG. 3(J) is of the type in which vertical wires and horizontal wires are pressure-welded or electrically welded at the intersections for preventing misalignment.

As the material for the sleeve 9, use may be made of metallic non-woven cloth comprising thin metal wires such as stainless steel wires, a thin plate of sintered metal, or a lath board, for example. The sleeve 9 does not necessarily need to have a single-layer structure and may be a laminate of materials of the same kind or different kinds. At least the outer circumferential surface of the sleeve 9 may be roughened by sandblasting, for example. This increases the friction with the pre-formed hole 13, which is expected to contribute to an increase of the pull-out resistance.

In the eleventh embodiment shown in FIG. 3(K), the anchor body 1 is knurled at least at the area of the expansive section 3. In the twelfth embodiment shown in FIG. 3(L), the anchor body 1 is formed with a large number of annular grooves, each having a V-shaped cross section, at least on the outer circumferential surface of the expansive section 3, so that the expansive section 3 is serrated in section.

Figure 4:
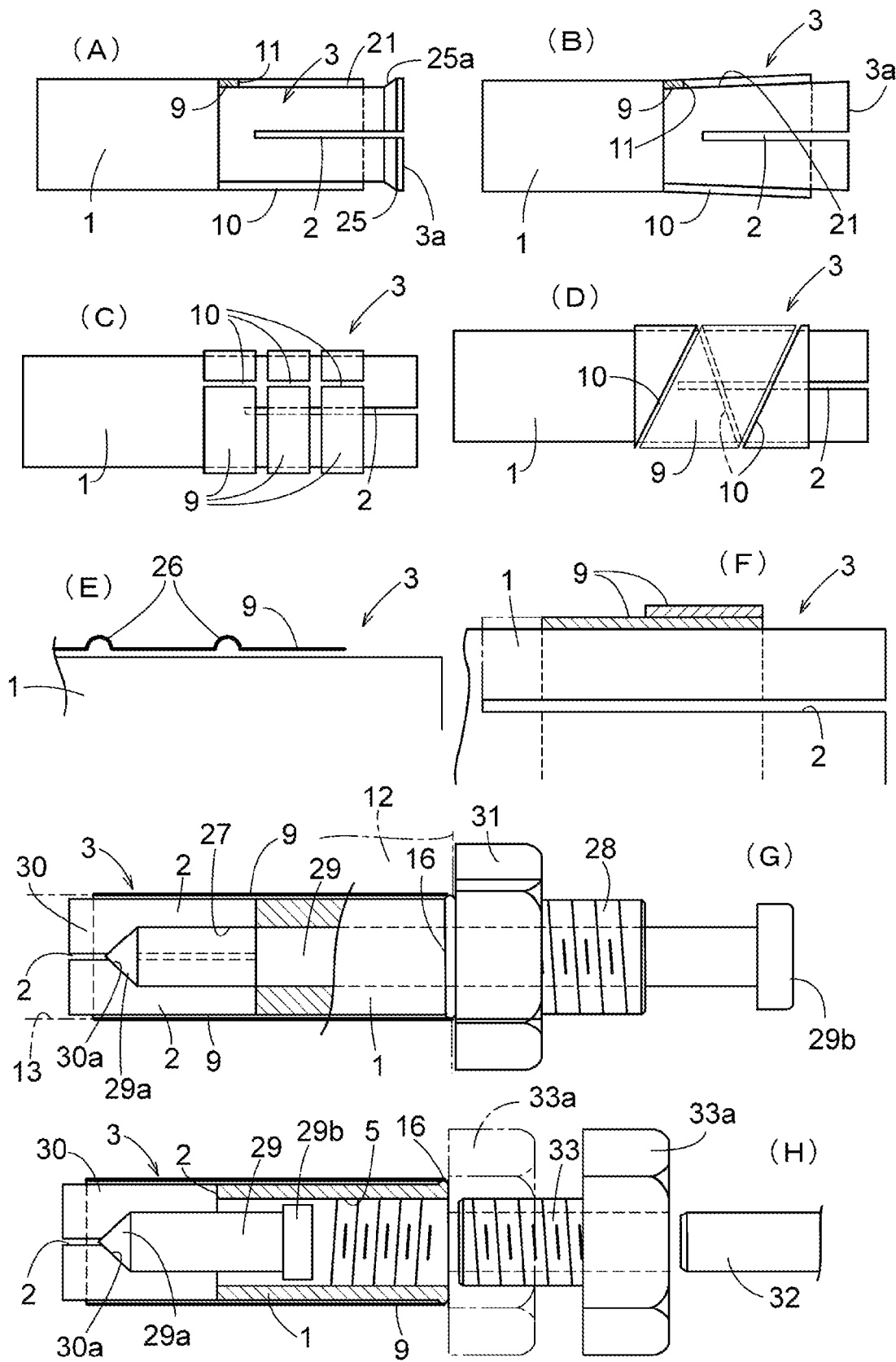
Figure 5:
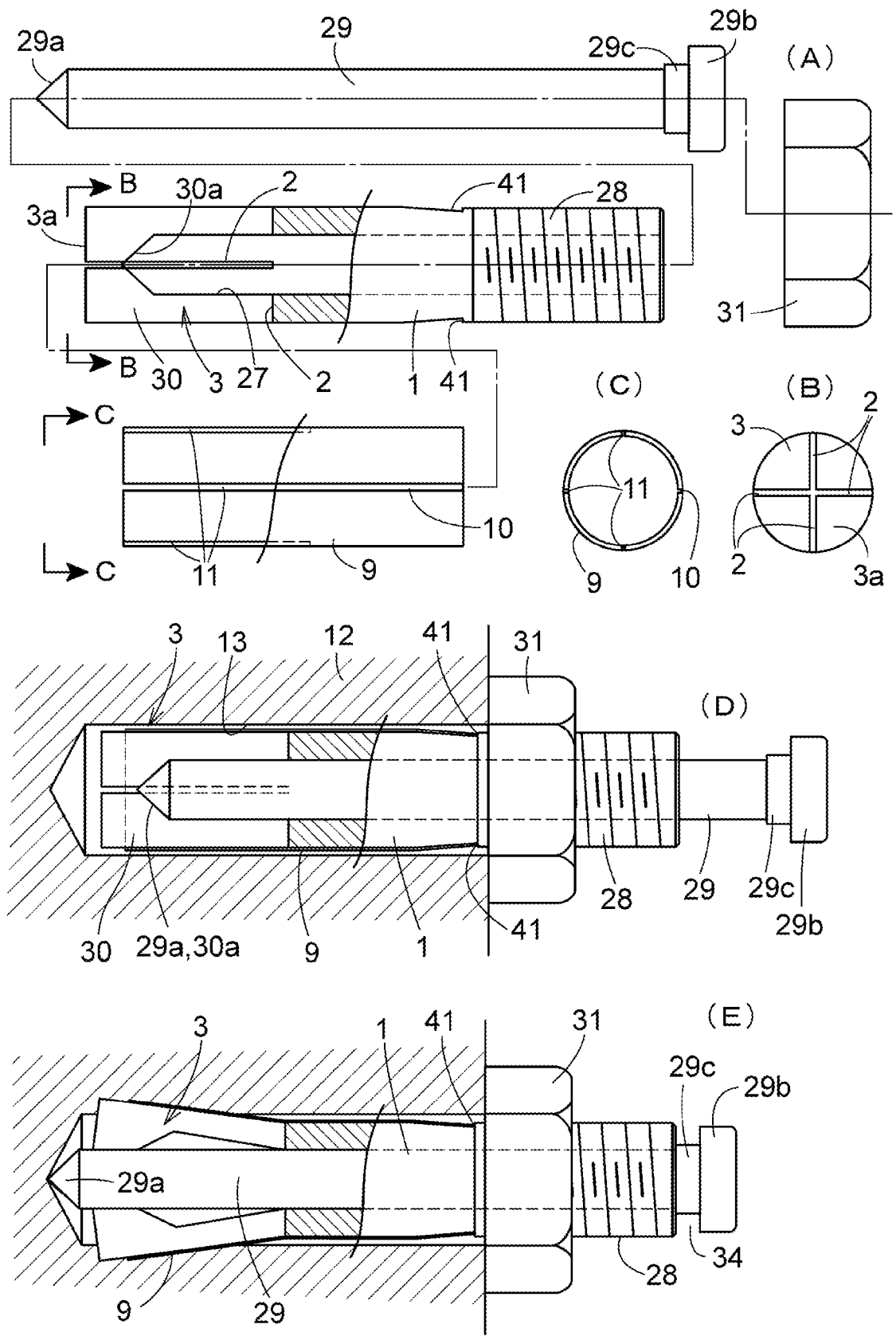
FIGS. 5 are views showing a twenty-first embodiment.
Figure 6:
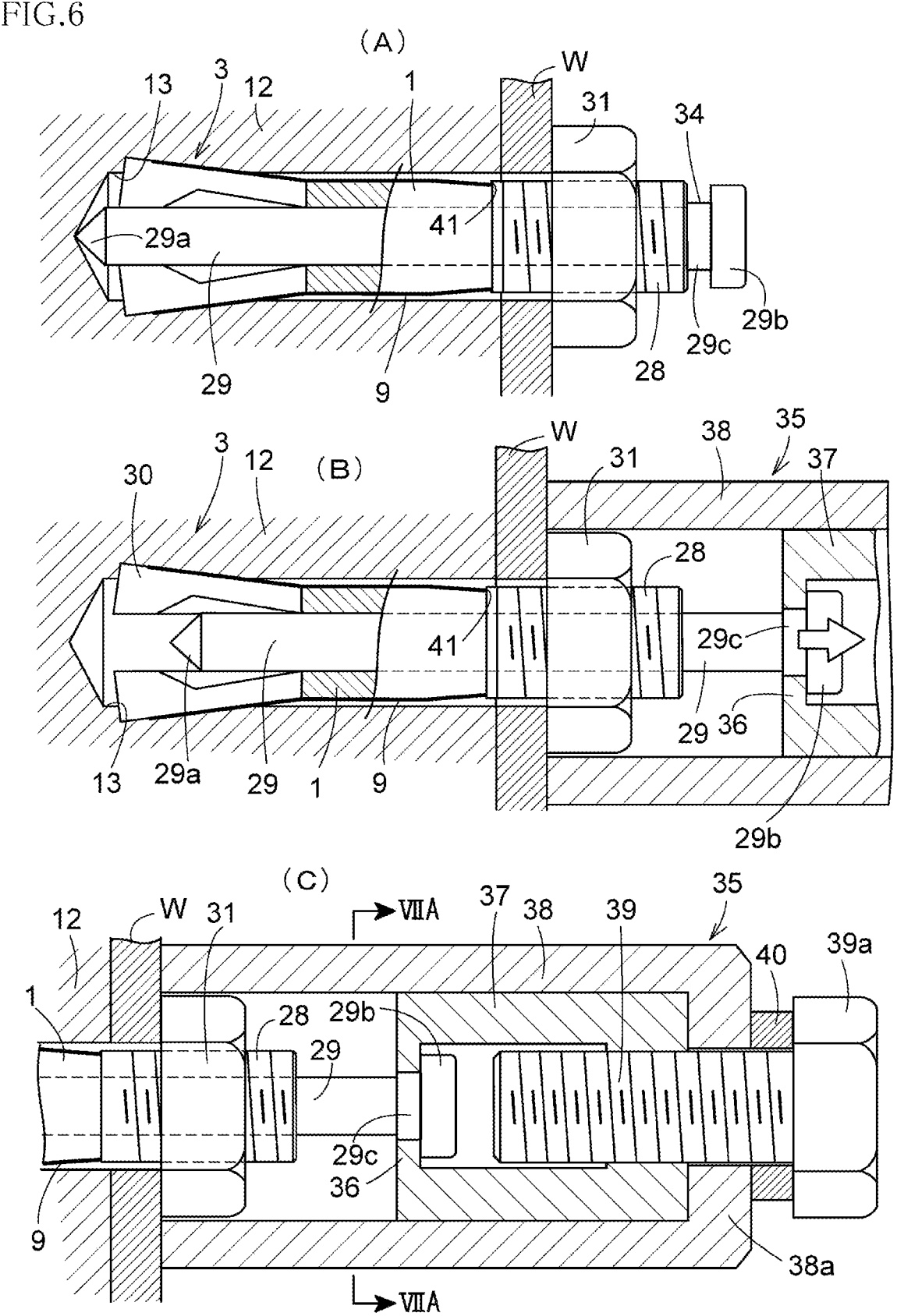
FIGS. 6 are views showing a twenty-first embodiment.

In the thirteenth embodiment shown in FIG. 4(A), a smaller-diameter portion 21 to which the sleeve 9 is fitted is provided at a portion of the anchor body 1 that includes the entirety of the expansive section 3, and a flange 25 is formed at the tip end of the expansive section 3. The back surface of the flange 25 is configured as an inclined surface 25a for allowing the escaping movement of the sleeve 9. In this embodiment, the sleeve 9 is made shorter than the smaller-diameter portion 21 so as to be movable relative to the anchor body 1.

A smaller-diameter portion 21 is provided also in the fourteenth embodiment shown in FIG. 4(B), but in this embodiment, the smaller-diameter portion 21 flares to have an increasing diameter toward the tip end. With such a configuration, the wedge effect of the sleeve 9 is expected to be stronger. Conversely to this embodiment, the expansive section 3 may be tapered to have a decreasing diameter toward the tip end. (In this case again, the expansive section 3 expansively deforms into a flaring shape toward the tip end, so that the removal preventing function is not impaired.)

In the fifteenth embodiment shown in FIG. 4(C), a plurality of sleeves 9 are arranged side by side along the axial direction. As will be understood from this example, it is possible to dispose a plurality of sleeves 9. In the sixteenth embodiment shown in FIG. 4(D), the sleeve 9 is formed by winding a strip-like plate into a helical shape. Thus, the outer main slit 10 extends helically.

In the seventeenth embodiment shown in FIG. 4(E), the sleeve 9 is formed with a plurality of (preferably, a large number of) round projections dotted thereon. The illustrated projections 26 project away from the anchor body 1, but the projections may be formed to come into contact with the anchor body 1. In this embodiment, the elasticity of the projections 26 can be utilized at the time of inserting the anchor into the pre-formed hole 13, so that the anchor may be temporarily held in the pre-formed hole 13. The projections 26 may be formed by cutting and raising. An embossed plate may be used instead.

In the eighteenth embodiment shown in FIG. 4(F), two sleeves 9 having different lengths are used in an overlapping manner. Specifically, the two sleeves 9 are arranged so as to overlap with each other, with the shorter one on the outer side. In the figure, the sleeve 9 on the outer side is offset toward the base end, but the outer sleeve 9 may be arranged to be offset toward the tip end. Alternatively, the outer sleeve 9 may be arranged in the middle of the inner sleeve 9. The two sleeves 9 may be simply disposed in an overlapping manner or may be fixed to each other by spot welding, for example. It is also possible to form the overlap by folding back a single sheet of material.

In the embodiment shown in FIG. 4(F), the sleeve 9 is arranged between the tip end and the base end of the expansive section 3. Thus, the expansive section 3 includes an exposed part that is not covered with the sleeve 9 on each of the tip end side and the base end side. As indicated by chain lines, it is also possible to arrange the sleeve 9 only at the area of the expansive section 3 such that the base end of the sleeve 9 is aligned with the base end of the expansive section 3, making only the tip end side of the expansive section 3 exposed in front of the sleeve 9.

Though not illustrated, it is also possible to make the expansive section 3 tapered toward the tip end and attach the sleeve 9 to the expansive section 3, with a certain region of the expansive section on the tip end side exposed. In this case, the sleeve 9 is attached only to the expansive section 3 so as not to be able to retreat. Thus, even when there is friction between the pre-formed hole 13 and the sleeve 9 during the insertion at the time of installation, the sleeve 9 can be inserted without retreating.

(6). Nineteenth to Twelfth Embodiments

The nineteenth embodiment shown in FIG. 4(G) is adapted to an expansion anchor of a core-rod driving type. Specifically, in this embodiment, the anchor body 1 is formed into a cylindrical shape with a central hole 27 opening rearward. The anchor body 1 has an expansive section 3 with a plurality of inner slits 2 opening to the tip end, and an externally threaded section 28 to be exposed outside the installation region. A core rod 29 is inserted into the anchor body from the base end. Thus, the externally threaded section 28 is an exposed portion.

The core rod 29 has a tapered portion 29a at the tip end. The expansive section 3 of the anchor body 1 is formed with an inward projections 30 that receives the pressing action by the core rod 29. The rear surface of the inward projections 30 is a tapered surface 30a for guiding the driving movement of the core rod 29. To restrict the driving depth, the base end (rear end) of the core rod 29 is formed with a head 29b having a diameter larger than the inner diameter of the anchor body 1. In this embodiment, a mounted object (now shown) is fixed to the installation surface with a nut 31.

The sleeve 9 is attached to a portion of the anchor body 1 that is received in the pre-formed hole 13 of the installation region. The sleeve 9 may have the configuration of FIG. 3(E), but other configurations may also be employed. In this embodiment, the expansive section 3 is expanded by driving the core rod 29 with a hammer.

In the twentieth embodiment shown in FIG. 4(H) again, the expansive section 3 is expanded by driving a core rod 29. In this embodiment, however, the core rod 29 is entirely inserted in the anchor body 1 and driven via a rod 32. The anchor body 1 is formed with an internally threaded hole 5, and a mounted object (not shown) may be fixed to the installation region by using a non-illustrated fastening bolt.

In this embodiment, the anchor body 1 is entirely received in the pre-formed hole, so that the driving of the core rod 29 is performed using a hollow bolt 33 having a head 33a. Specifically, the hollow bolt 33 is configured for the rod 32 to pass through it, and with the anchor body 1 held immovable by screwing the hollow bolt 33 to the internally threaded hole 5, the core rod 29 is driven via the rod 32. Needless to say, after the anchor body 1 is attached to the installation region, the hollow bolt 33 is removed. The sleeve 9 is attached to the anchor body 1 in a manner similar to FIG. 4(G). Assembling the rod 32 to the hollow bolt 33 in advance improves the work efficiency and is advantageous.

Conventionally, anchors of the type to expand the expansive section by driving a core rod from the outside have been configured as a male-thread type, as disclosed in Patent Document 4. The present embodiment realizes a female-thread type anchor for a core-rod driving configuration by using the hollow headed bolt 33. Since the female-thread type anchor is not exposed to the outside of the installation surface, treatment after the removal of an element is not necessary. The anchor having such a configuration can be an independent invention regardless of the presence or absence of the sleeve. Since this configuration is of a core-rod driving type, the female-thread type configuration is realized while achieving a short length.

(7). Twenty-First to Twenty-Seventh Embodiments

The twenty-first to twenty-seventh embodiments shown in FIGS. 5-9 are variations of the nineteenth embodiment shown in FIG. 4(G) and are common in that the core rod 29 is removable after the installed object is removed.

Of these, the feature of the twenty-first embodiment shown in FIGS. 5-7(A) is that the core rod 29 is formed, at its base end (rear end), with a spacer 29c having a diameter smaller than the head 29b and larger than the central hole 27. With such a configuration, after the core rod 29 is driven, an annular space 34 having an axial width corresponding to that of the spacer 29c is defined between the base end of the anchor body 1 and the head 29b of the core rod 29, as shown in FIG. 5(E).

Figure 7:
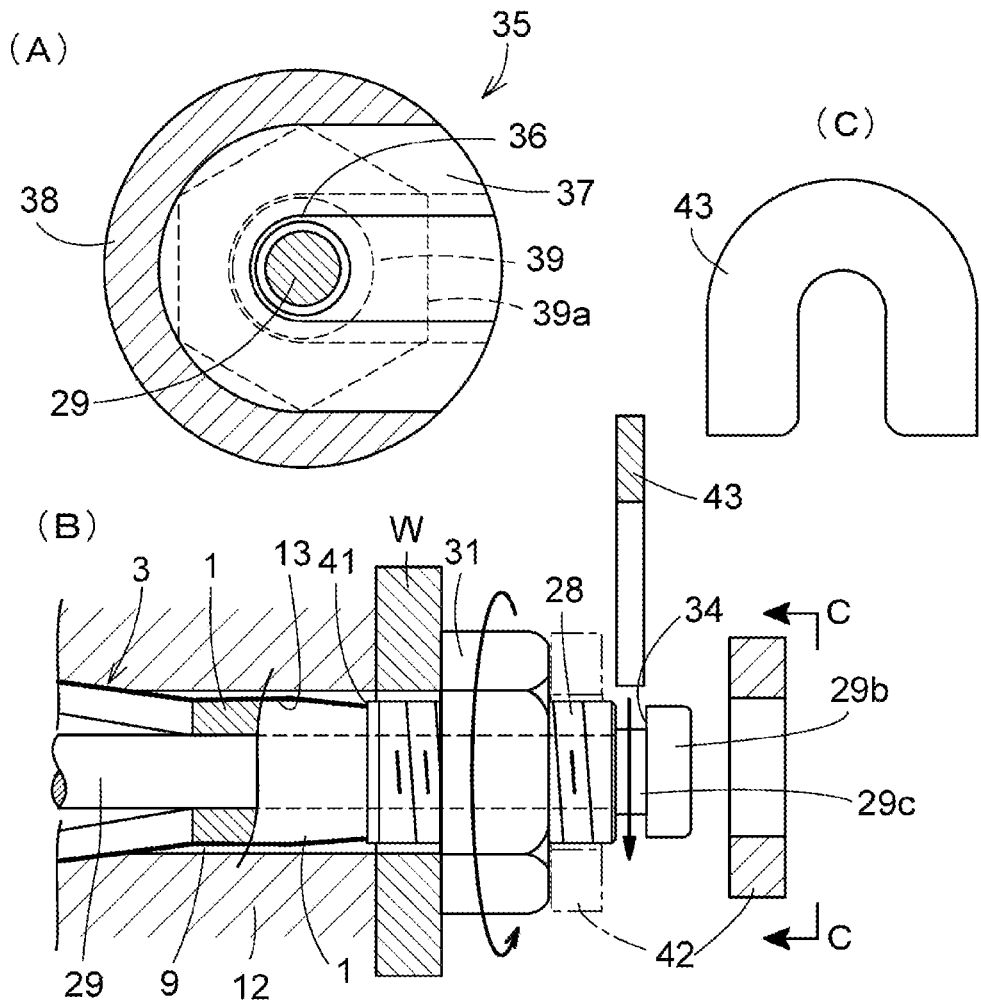
FIG. 7(A) is a sectional view taken along line VIIA-VIIA in FIG. 6(C)
FIG. 7(B) is an exploded sectional side view showing a part of a twenty-second embodiment.
FIG. 7(C) is a sectional view taken along line C-C in FIG. 7(B).
Figure 8:
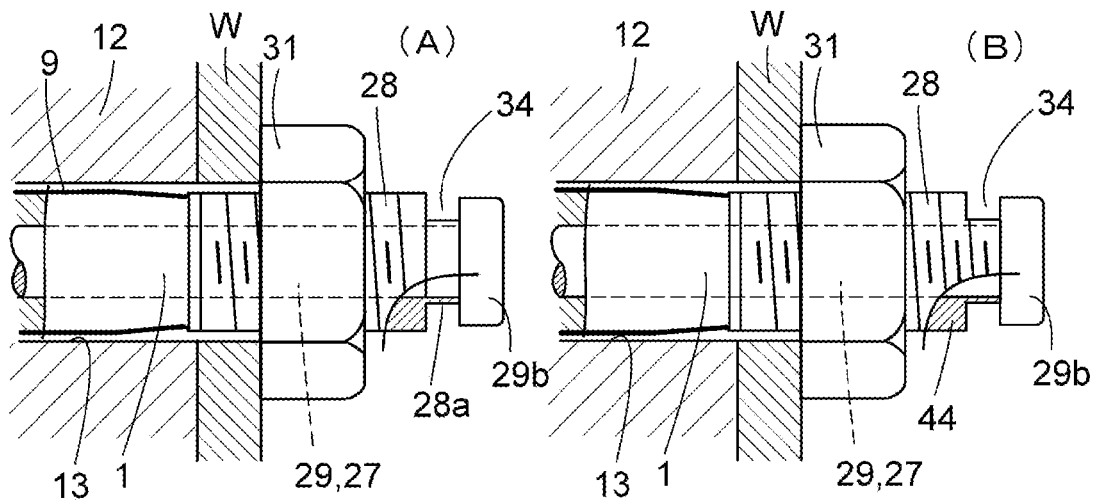
FIG. 8(A) is a sectional side view of a twenty-third embodiment.
FIG. 8(B) is a sectional side view of a twenty-fourth embodiment.
Figure 9:
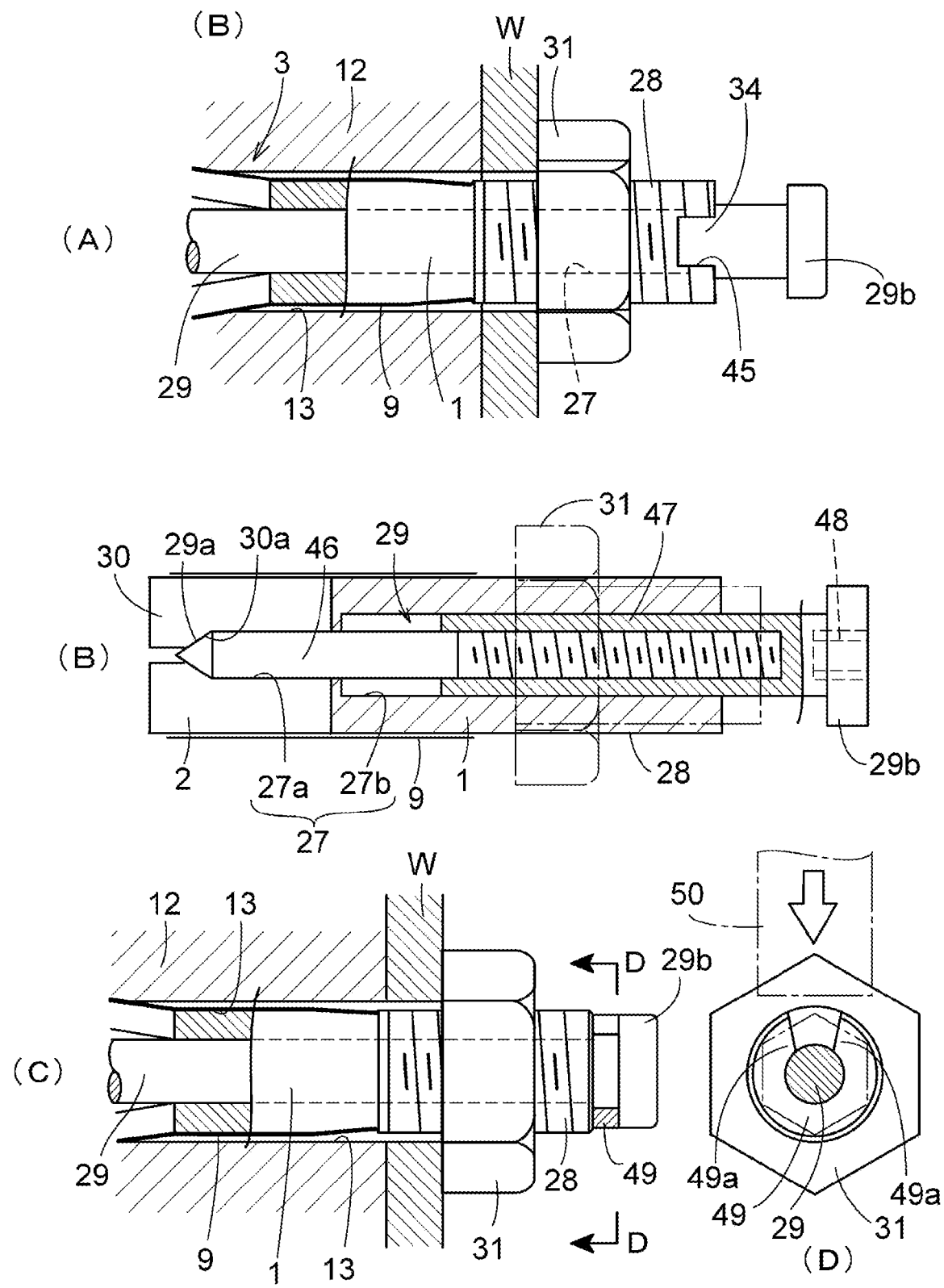
FIG. 9(A) is a sectional side view of a twenty-fifth embodiment.
FIG. 9(B) is a sectional side view of a twenty-sixth embodiment.
FIG. 9(C) is a sectional side view of a twenty-seventh embodiment.
FIG. 9(D) is a sectional view taken along lines D-D in FIG. 9(C).

With such an arrangement, after the object W is removed, the core rod 29 can be removed by using e.g. a pull-out jig 35 shown in FIGS. 6(B), 6(C) and 7. The pull-out jig 35 has a slider 37 with a U-shaped engagement hook 36 that fits to the spacer 29c of the core rod 29 from the outside, a holder 38 that holds the slider 37 non-rotatably and slidably, and a head bolt 39 for pulling out the slider 37.

As shown in FIG. 7(A), the holder 38 is U-shaped in cross section and has a bottom plate 38a, and the slider 37 is U-shaped. The bolt 39 is passed through the bottom plate 38a of the holder 38 and screwed into the holder 38, whereby the core rod 29 is pulled out. When the core rod 29 is pulled out, the pressing force of the expansive section 3 against the pre-formed hole 13 considerably reduces, so that the anchor body 1 can be easily pulled out by using a tool like a claw bar, for example. Although a collar 40 is fitted to the under-head position of the bolt 39, such a collar may be dispensed with.

In this embodiment, as clearly shown in FIG. 5(A), the anchor body 1 is formed with a groove 41 as a stopper for preventing retreating movement of the sleeve 9. The groove 41 may be annular or may be formed only at a given circumferential position.

In FIGS. 7(B) and 7(C), the pull-out jig 35 comprises a collar 42 that fits to the externally threaded section 28 of the anchor body 1 from the outside, and a U-shaped stopper plate 43 that fits to the spacer 29c of the core rod 29 from the outside. In this embodiment, after the collar 42 is fitted to the externally threaded section 28, the stopper plate 43 is fitted to the spacer part 29c of the core rod 29. By screwing back the nut 31 in this state, the core rod 29 can be retreated.

In the twenty-third embodiment shown in FIG. 8(A), while the core rod 29 has a simple configuration provided with a head 29b similarly to that shown in FIG. 4(G), the externally threaded section 28 of the anchor body 1 is formed with a smaller-diameter cylindrical portion 28a projecting rearward. Thus, a doughnut-shaped space 34 is formed.

In the twenty-fourth embodiment shown in FIG. 8(B), the externally threaded section 28 of the anchor body 1 is formed with a pair of cutouts 44 on opposite sides of the axis so as to form a pair of spaces 34. In the twenty-fifth embodiment shown in FIG. 9(A), a groove 45 orthogonal to the axis is formed on the rear surface of the externally threaded section 28, defining a single space 34 that opens rearward. In this embodiment, a pull-out jig with a pair of hooks is used.

In the twenty-sixth embodiment shown in FIG. 9(B), the core rod 29 has a dual structure comprising a threaded rod 46 and a threaded cylinder 47 that are screwed together. The threaded bar 46 is formed with a tapered surface 29a. The threaded cylinder 47 is formed with a head 29b. The rear end surface of the threaded cylinder 47 is formed with a driver-bit engagement groove 48. In this embodiment, the central hole 27 of the anchor body 1 has a varying diameter, including a smaller-diameter portion 27a into which the threaded bar 46 is closely fitted and a larger-diameter part 27b into which the threaded cylinder 47 is closely fitted.

The threaded bar 46 and the threaded cylinder 47 are screwed together in advance and driven into the anchor body 1 in the screwed state. In the driven state, the head 29b is in contact with rear end surface of the anchor body 1. When the mounted object becomes unnecessary, the threaded cylinder 47 is screwed back to a certain degree by using a driver bit (not shown) to form a space 34, and the pull-out work is performed by utilizing the space 34.

In the twenty-seventh embodiment shown in FIG. 9(C), the core rod 29 has a simple configuration provided with a head 29b at its base end, and a collar 49 as a space-defining means is fitted to the base end of the core rod 29. The collar 49 is configured to be fitted to the core rod 29 in a direction orthogonal to the axis and is provided with a pair of constrictive parts 49a spaced apart from each other by a distance smaller than the outer diameter of the core rod 29. Thus, the collar 49 is attached to the core rod 29 by forced fitting using elastic deformation.

The collar 49 is kept attached to the core rod 29 even after the installation. When the object W becomes unnecessary, the collar 49 is forced to expand by using a plate-like pushing member 50, whereby the collar 49 is detached from the core rod 29. As a result, a space 34 that allows access of a jig is formed between the head 29b and the anchor body 1.

(8). Twenty-Eighth Embodiment

Figure 10:
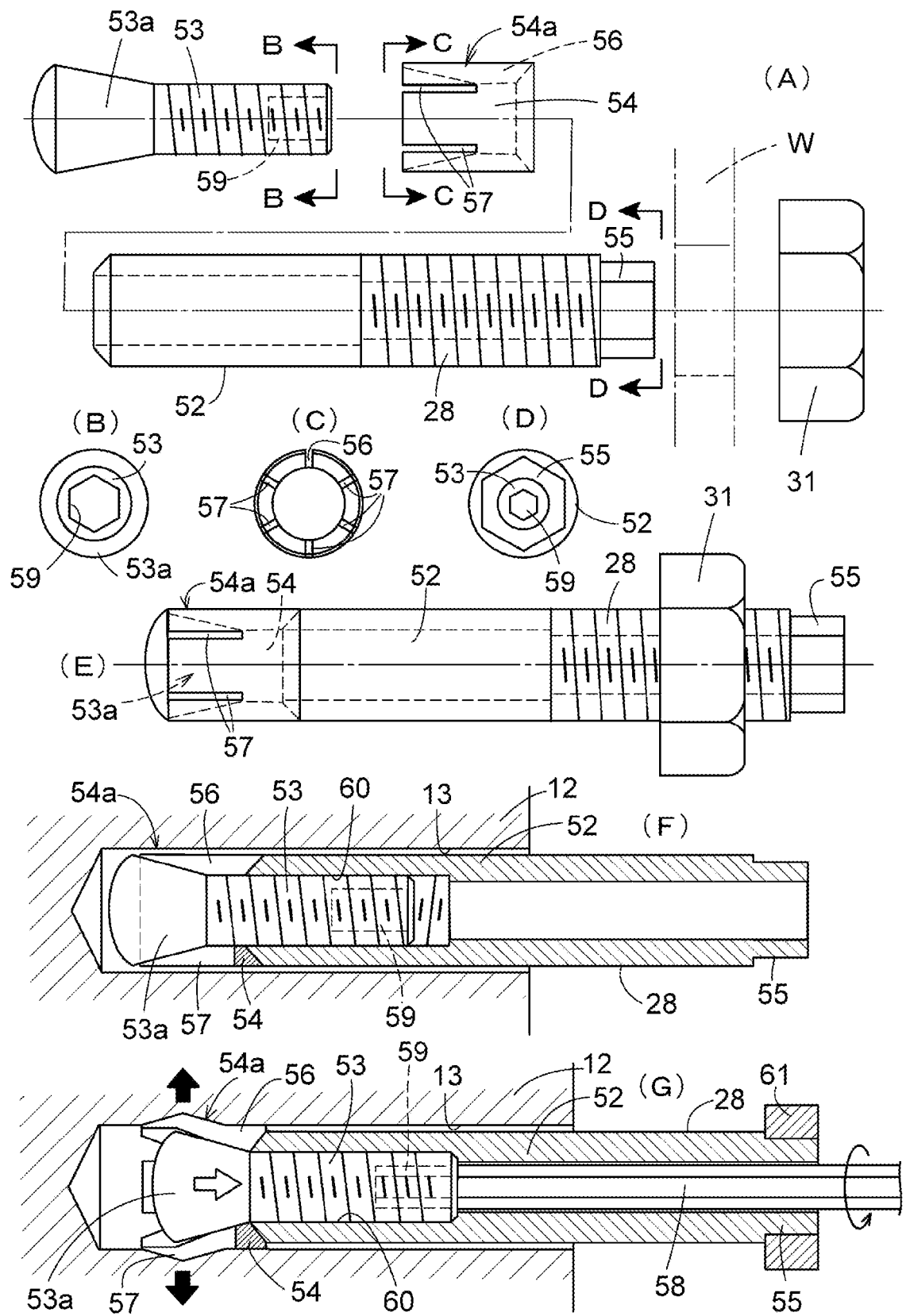
FIGS. 10 are views showing a twenty-eighth embodiment.
Figure 11:
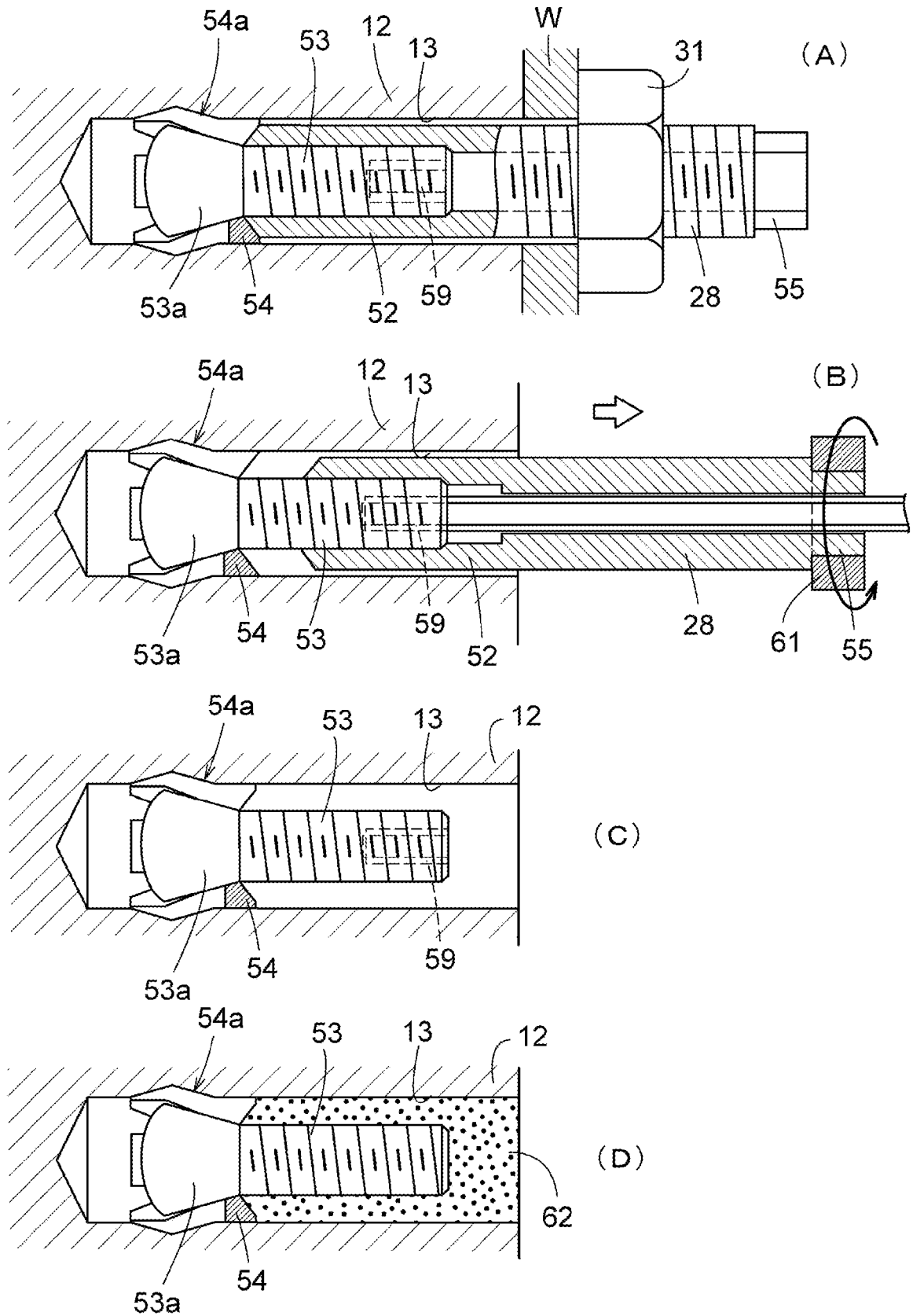
FIGS. 11 are views showing a twenty-eighth embodiment.

FIGS. 10 and 11 shows a twenty-eighth embodiment as an implementation of the ninth invention. The expansion anchor of this embodiment has an anchor body 52 in the form of a cylinder open at both the front end and the rear end, a front member (inner bolt) 53 threaded into the anchor body 52 through the front end, and a sleeve 54 fitted to the front member 53 from the rear side. The outer diameter of the sleeve 54 is set to be equal to the outer diameter of the anchor body 52, and the front end of the anchor body 52 is held in contact with the rear end of the sleeve 54.

The anchor body 1 is formed with an externally threaded section 28 to be exposed outside the installation region 12. The rear end of the externally threaded section 28 is integrally formed with a hexagonal engagement boss 55, which is an example of an outer engagement portion, projecting rearward from the externally threaded section 28.

The tip end of the front member 53 is integrally formed with a flaring (conical) head 53a having an increasing diameter toward the front, whereas the sleeve 54 is formed with an expansive section 54a that fits around the head 53a of the front member 53. The expansive section 54a is formed with a main slit 56 and a plurality of auxiliary slits 57 for realizing expansion. The inner circumferential surface of the expansive section 54a is a flaring surface that comes into close contact with the head 53a of the front member 53. Note that the main slit 56 may not be formed so that the base-side portion of the expansive section 54a is in the form of a complete ring.

The rear end surface of the bolt constituting the front member 53 is formed with an engagement hole 59 for a bar wrench 58 such as a hexagonal wrench to engage therein. Needless to say, the anchor body 52 is formed with an internally threaded hole 60 for screwing engagement with the front member 53. The anchor body 52 is further formed with a central hole that is concentric with the internally threaded hole 60 and opens to the base end.

In this embodiment, to attach the anchor, the anchor body 1 is inserted into the pre-formed hole 13 of the installation region 12 to a predetermined depth, with the front member 53 facing forward. Then, with the anchor body 52 held non-rotatably with a female wrench 61 such as a spanner or a box-end wrench, the front member 53 is screwed rearwardly with the hexagonal wrench 58. The front member 53 retreating in this way causes the expansive section 54*a* of the sleeve 54 to expand, so that the expansive section 54*a* bites into the pre-formed hole 13. The expansive section 54*a* of the sleeve 54 is thus pressed against (or bites into) the pre-formed hole 13, so that the anchor body 52 is held against removal.

When the object W becomes unnecessary, the anchor body 52 can be pulled out from the spot by rearwardly screwing the anchor body 52 with the female wrench 61 while holding the front member 53 non-rotatably with the hexagonal wrench 58 as shown in FIG. 11(B). After the anchor body 52 is removed, the front member 53 and the sleeve 54 are entirely hidden in the pre-formed hole 13. Thus, the front member 53 or the sleeve 54 will not be an obstacle. As shown in FIG. 11(D), the pre-formed hole 13 may be closed as required by filling the pre-formed hole 13 with a filler 62 such as mortar or a sealing material.

(5). Twenty-Ninth to Thirty-Two Embodiments

Figure 12:
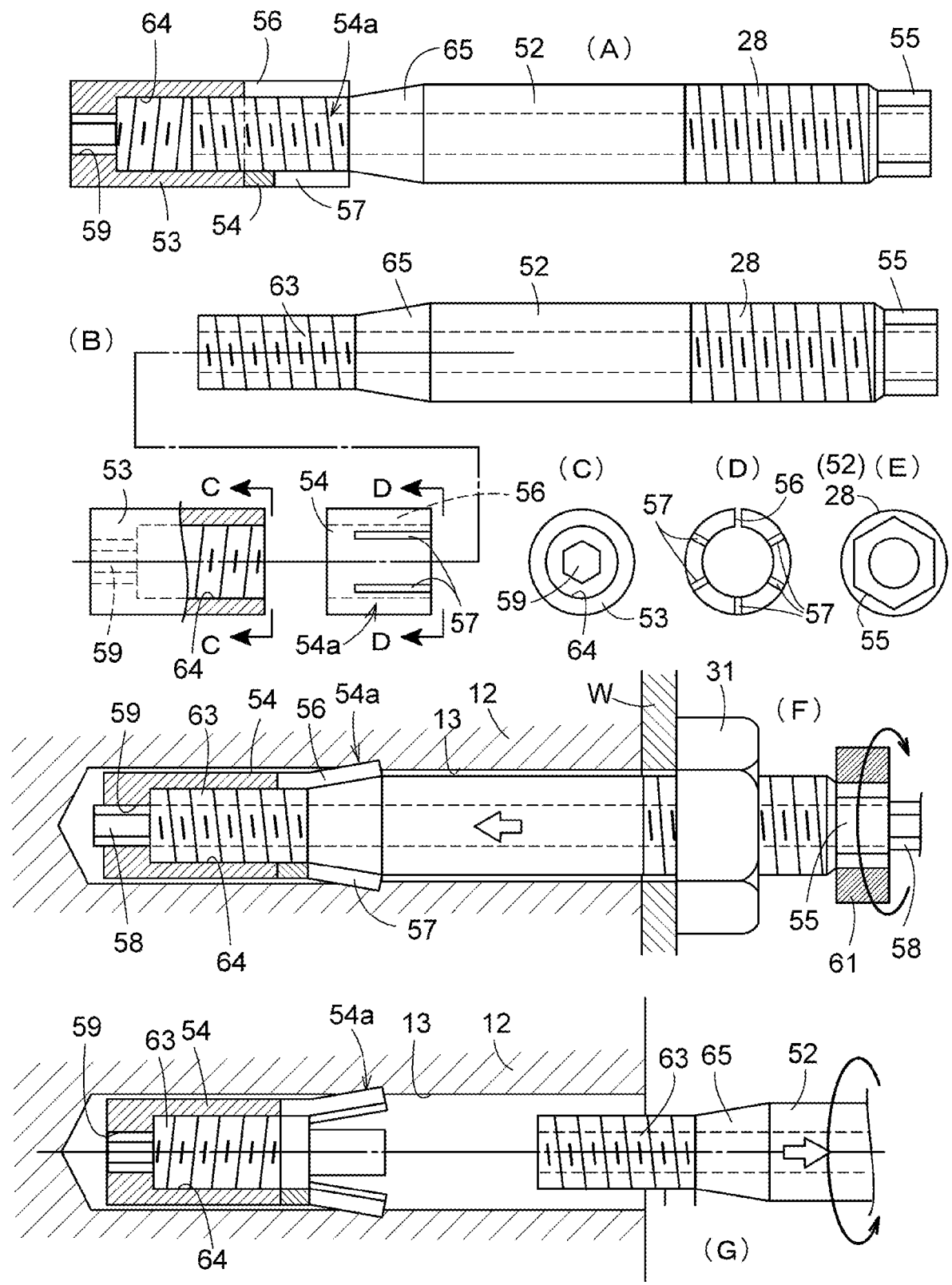
FIGS. 12 are views showing the twenty-eighth embodiment.

As with the twenty-eighth embodiment, the anchor of the twenty-ninth embodiment shown in FIG. 12 also has an anchor body 52, a front member 53 and a sleeve 54. In this embodiment, however, the front end of the anchor body 52 is formed with a front male screw 63, and the sleeve 54 is fitted over the front male screw 63. Meanwhile, the front member 53 is formed into the form of a bottomed cylinder and formed with an internally threaded hole 64 for screwing engagement with the front male screw 63. The anchor body 52 has a tapered surface 65 tapering toward the front end and connected to the rear end of the front male screw 63.

In this embodiment, the expansive section 54*a* of the sleeve 54 is oriented rearward. Thus, the direction of expansion is opposite to that of the twenty-eighth embodiment. The tip end of the front member 53 is formed with an engagement hole 59 for the hexagonal wrench 58 to engage therein.

In the embodiment shown in FIG. 12, when the anchor body 52 is screwed forwardly with a female wrench 61 with the front member 53 held non-rotatably with the hexagonal wrench 58, the expansive section 54*a* of the sleeve 54 expands due to the guiding action of the tapered surface 65 of the anchor body 52. In this embodiment, when a load in the pull-out direction is exerted on the anchor body 52, the expansive section 54*a* of the sleeve 54 tends to expand for providing the catching effect, thereby realizing a high pull-out resistance.

In the twenty-ninth embodiment shown in FIG. 12, the sleeve 54 is directly pushed by the anchor body 52. In contrast, in the thirtieth embodiment shown in FIGS. 13(A)-(F), a wedge member 66 having a tapered surface 66*a* tapering toward the tip end is arranged between the sleeve 54 and the anchor body 52 so that the sleeve 54 is pushed via the wedge member 66. Thus, the front end of the anchor body 52 is made a flat surface. The sleeve 54 and the wedge member 66 are fitted over a bolt portion of the front member 53 from the outside.

Figure 13:
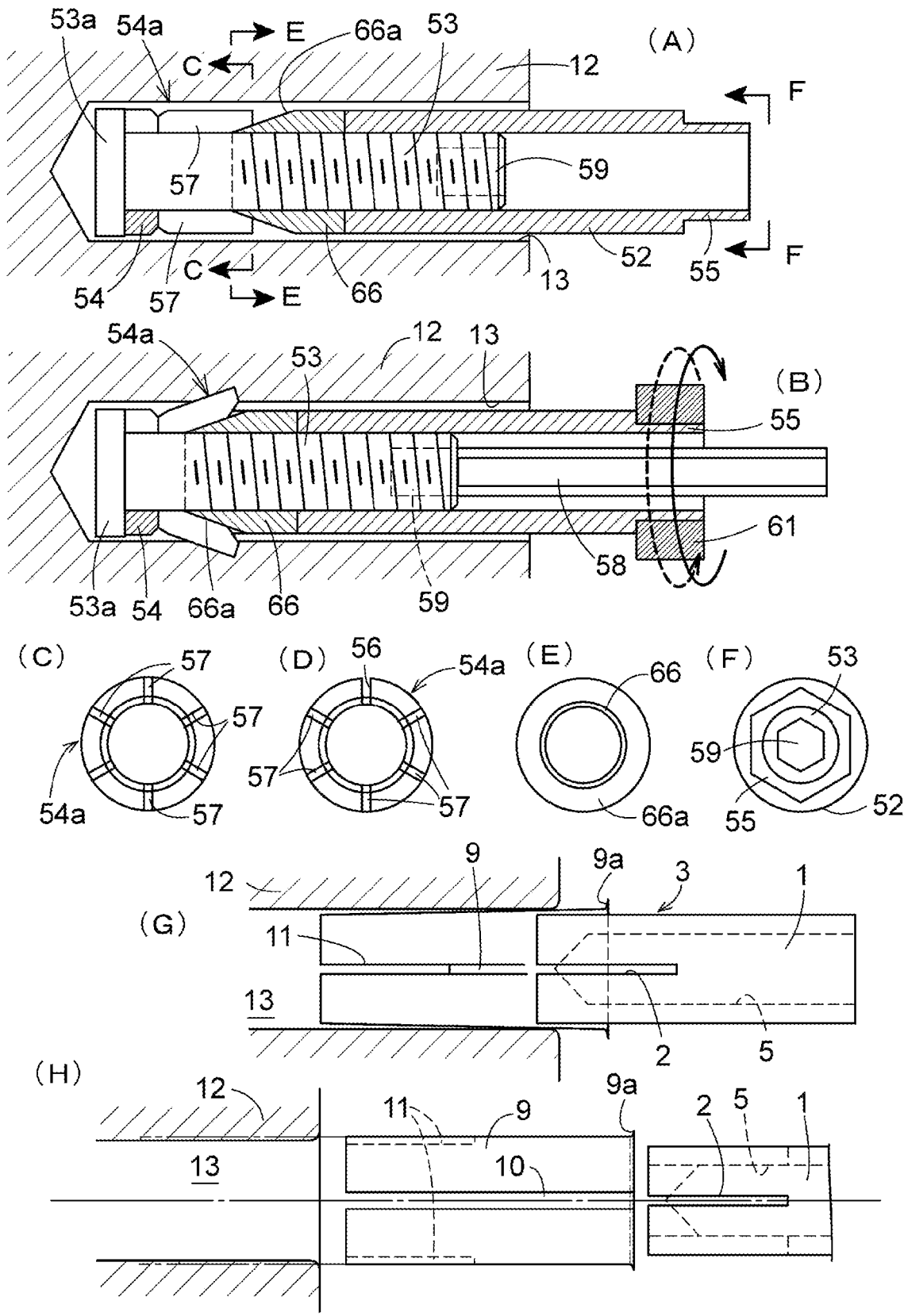
FIGS. 13 are views showing a thirtieth embodiment.

In this embodiment, the sleeve 54 is not subjected to a rotating action. Thus, conceivably, the compressive force of the anchor body 52 is efficiently converted into expansion of the expansive section 54*a*. In the embodiment of FIG. 13, the tip end of the front member 53 is provided with a flange-like head 53*a,* and the sleeve 54 is held by the head 53*a* against forward movement.

In the thirtieth embodiment, the sleeve 54 may have a configuration shown in FIG. 13(C) in which the area of the expansive section 54*a* is provided with the auxiliary slits 57 alone and the sleeve includes a non-expansive section, or may have a configuration shown in FIG. 13(D) in which the sleeve has both a main slit 56 extending along the entire length and auxiliary slits 57 opening only at the tip end.

In the embodiments shown in FIGS. 12 and 13(A)-(F), the stronger the biting of the expansive section 54*a* into the pre-formed hole 13 is, the higher the pull-out resistance is. Thus, it is preferable to manufacture the sleeve 54 from as hard a material as possible (e.g., tooling steel).

In the thirty-first embodiment shown in FIG. 13(G), in attaching the sleeve 9 to the anchor body 1 in advance, a considerable portion (e.g. 70% to 90%) of the sleeve 9 is made to project from the anchor body 1. Therefore, before installation, the length of the fitted portion of the sleeve 9 and the anchor body 1 is short. The portion of the sleeve 9 that projects from the anchor body 1 is tapered toward the tip end so as to have a slightly smaller diameter than the pre-formed hole 13. The base end of the sleeve 9 is formed with a flange part 9*a* having a flaring shape, for example.

In this embodiment, during installation, the sleeve 9 is entirely inserted into the pre-formed hole 13 and positioned by bringing the flange part 9*a* at the base end into contact with the base end of the pre-formed hole 13. Then, in this state, the anchor body 1 is pushed into the pre-formed hole 13. The pushing may be performed manually by the worker. When such manual pushing cannot be performed, the anchor body may be hit with a hammer. In this process, since the flange part 9*a* is held in engagement with the opening edge of the pre-formed hole 13, the sleeve 9 does not move together, and the anchor body 1 is smoothly inserted.

The thirty-second embodiment shown in FIG. 13(H) is an example of the installation method. First, the sleeve 9 is inserted into the pre-formed hole 13, and then the anchor body 1 is inserted. Next, the expansive section 3 is expanded. As an expanding means, use may be made of balls or a core rod. As with the thirty-first embodiment, the base end of the sleeve 9 is formed with a flange part 9*a,* so that the sleeve 9 does not move together during the insertion of the anchor body 1.

In an implementation to first insert the sleeve 9 in this way, the sleeve 9 may be set to have a diameter a larger than the pre-formed hole 13 and compressed to be inserted into the pre-formed hole 13. In this case, the sleeve 9 is pressed against the pre-formed hole 13 due to its own elastic restoring force. Thus, the sleeve 9 is held in the pre-formed hole 13 against removal even when installed to a ceiling, for example. Moreover, since the sleeve 9 expands to its full extent, the resistance in inserting the anchor body 1 is small.

In another implementation, the sleeve 9 may be set to have an outer diameter that allows insertion into the pre-formed hole 13 without being compressed. In this case, the insertion of the sleeve 9 into the pre-formed hole 13 is very easy. Since the sleeve 9 is expanded by the insertion of the anchor body 1, the wedge action is exerted without any problems. The flange part 9*a* may be formed to be discontinuous along the circumferential direction.

(9). Other Embodiments

Though embodiments of the present invention have been described, the inventions of the present application can be embodied in many other ways. For example, in the first through the eighth inventions, an auxiliary layer such as a synthetic resin layer or a plating layer may be formed on the outer surface of the sleeve 9 to increase the frictional resistance with the pre-formed hole. The sleeve may be made of a hard synthetic resin such as polycarbonate or a ceramic-based material.

By forming an annular groove at the base end of the expansive section, the expansive section may be creased in advance so as to bend in a predetermined manner. In this case, the base end of the sleeve may be formed with an engagement piece that engages in the annular groove. The sleeve may be arranged at a portion between the base end and the tip end of the expansive section. In this case again, shifting movement during transportation or installation is prevented by forming an annular groove in the expansive section while forming in the sleeve an engagement piece that engages in the annular groove.

The cross sectional shape of the anchor body may not necessarily be a perfect circle but may be other shapes such as an oval or a regular polygon. For both the anchor body and the sleeve, the number of slits can be set freely. As for the slits of the anchor body, it is reasonable to form three slits at equal intervals. However, considering the milling work, it is realistic to form four slits as in the embodiments. (It is also possible to form five or more slits.) The number of the slits in the anchor body and the number of the slits in the sleeve may be different from each other.

As an expansion anchor of a core-rod driving type, there is an expansion anchor configured such that a tapered cone member (expansion actuator) is fitted into an anchor body of a female-thread type from the tip end, and with the cone member held in contact with the bottom surface of the pre-formed hole, the anchor body is driven by hitting to expand the expansive section. The present invention is also applicable to this type of expansion anchor.

INDUSTRIAL APPLICABILITY

The present invention can be embodied as an expansion anchor. Therefore, the present invention is industrially applicable.

DESCRIPTION OF REFERENCE SIGNS

W Mounted object
1 Anchor body
2 Inner slit
3 Expansive section
4 Balls forming a part of an expansion actuator
5 Internally threaded hole
6 Expanding bolt forming a part of an expansion actuator
8 Inward projections
9 Sleeve
10 Outer main slit
11 Outer auxiliary slit
12 Installation region
13 Pre-formed hole
15 Fastening bolt
26 Annular projection as an example of a stopper
29 Core rod
29a Tapered surface
29b Head
29c Spacer
30 Inward projections
30a Tapered surface
34 Space
35 Pull-out jig
52 Anchor body
53 Front member
54 Sleeve
54a Expansive section
55 Engagement boss
58 Hexagonal wrench
59 Engagement hole
61 Female wrench
66 Wedge member

The invention claimed is:

1. An expansion anchor comprising:
a hollow anchor body formed with a non-expansive section and an expansive section at a portion to be inserted into a pre-formed hole in an installation region, the expansive section being expansively deformable in a direction orthogonal to an axis of the anchor body;
an expansion actuator that is capable of expansively deforming the expansive section of the anchor body; and
a sleeve that externally surrounds at least a portion of the expansive section of the anchor body,
wherein the sleeve and the anchor body are configured to be movable relative to each other such that, when a pull-out force is exerted on the anchor body with the expansive section expanded, the sleeve is stopped in the pre-formed hole while allowing the anchor body to retreat;
wherein the sleeve spans the expansive section and the non-expansive section of the anchor body;
wherein the expansive section of the anchor body is formed with an axially elongated inner slit that allows the expansive section to be expansively deformable in the direction orthogonal to said axis, and
wherein the expansion actuator comprises a group of balls arranged in the anchor body at least within the expansive section, and a bolt that forwardly pushes the group of balls.

2. The expansion anchor according to claim 1, wherein when the expansive section is expanded, a tip end of the sleeve is positioned short of a tip end of the expansive section so that the expansive section includes an exposed part projecting from the tip end of the sleeve.

3. The expansion anchor according to claim 1, wherein the expansive section is formed with a tapered part for expanding contact with the group of balls.

4. The expansion anchor according to claim 1, wherein the sleeve is made of a metal, surrounds the anchor body, and is split by a main outer slit extending along an entire length of the sleeve so as to have a non-looped shape, and
a portion of the sleeve that fits to the expansive section of the anchor body is divided into a plurality of segments by an auxiliary outer slit that is open only forwardly of the anchor body.

5. A method for fixing the expansion anchor according to claim 1 in an installation region, the method comprising:
inserting the sleeve alone into the pre-formed hole, subsequently inserting the anchor body into the pre-formed hole via the sleeve, and thereafter expanding the expansive section of the anchor body by the expansion actuator.

6. A method for fixing an expansion anchor in an installation region, the expansion anchor comprising:
a hollow anchor body formed with a non-expansive section and an expansive section at a portion to be inserted into a pre-formed hole in an installation region, the expansive section being expansively deformable in a direction orthogonal to an axis of the anchor body;

an expansion actuator that is capable of expansively deforming the expansive section of the anchor body; and a sleeve that externally surrounds at least a portion of the expansive section of the anchor body, the sleeve and the anchor body being configured to be movable relative to each other such that, when a pull-out force is exerted on the anchor body with the expansive section expanded, the sleeve being stopped in the pre-formed hole while allowing the anchor body to retreat; and the sleeve spanning the expansive section and the non-expansive section of the anchor body;

the method comprising:

inserting the sleeve alone into the pre-formed hole, subsequently inserting the anchor body into the pre-formed hole via the sleeve, and thereafter expanding the expansive section of the anchor body by the expansion actuator.

\* \* \* \* \*